US012681609B2

(12) United States Patent
Yamaguchi

(10) Patent No.: US 12,681,609 B2
(45) Date of Patent: Jul. 14, 2026

(54) DETECTION DEVICE

(71) Applicant: Japan Display Inc., Tokyo (JP)

(72) Inventor: Hiroshi Yamaguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/260,884

(22) Filed: Jul. 7, 2025

(65) Prior Publication Data

US 2025/0335057 A1      Oct. 30, 2025

Related U.S. Application Data

(63) Continuation of application No. PCT/JP2024/000194, filed on Jan. 9, 2024.

(30) Foreign Application Priority Data

Jan. 10, 2023      (JP) ................................. 2023-001905

(51) Int. Cl.
*G06F 3/044* (2006.01)
*G06F 3/041* (2006.01)

(52) U.S. Cl.
CPC .......... *G06F 3/0443* (2019.05); *G06F 3/0416* (2013.01); *G06F 3/0446* (2019.05);
(Continued)

(58) Field of Classification Search
CPC .......... G06F 3/044; G06F 2203/04101; G06F 2203/04108
See application file for complete search history.

(56) References Cited

U.S. PATENT DOCUMENTS 9,151,792 B1      10/2015   Kremin et al.
10,705,560 B1 *   7/2020    Petrie ........................ G06F 1/08
(Continued)

FOREIGN PATENT DOCUMENTS

JP       2000-250710 A      9/2000
JP       2008-164449 A      7/2008
(Continued)

OTHER PUBLICATIONS

Search report issued in related International Patent Application No. PCT/JP2024/000194, mailed on Mar. 26, 2024 and English translation of same. 7 pages.

*Primary Examiner* — Kevin M Nguyen
(74) *Attorney, Agent, or Firm* — K&L Gates LLP

(57) ABSTRACT

A detection device includes: a sensor circuit; an AFE circuit configured to acquire a detection signal from the sensor circuit; a control circuit configured to control the AFE circuit; a reference potential generation circuit configured to operate with a first reference potential as a ground potential and generate a second reference potential synchronized with a square wave signal output from the AFE circuit; a first isolator provided on a transmission path for the square wave signal between the AFE circuit and the reference potential generation circuit; and a second isolator provided on a signal transmission path between an external processing device that operates with the first reference potential as the ground potential and the control circuit. The AFE circuit and the control circuit operate with the second reference potential as the ground potential, and signal transmission paths between the AFE circuit and the control circuit are electrically coupled.

10 Claims, 19 Drawing Sheets

(52) U.S. Cl.
　　CPC .............. *G06F 2203/04107* (2013.01); *G06F*
　　　　　　*2203/04108* (2013.01); *G06F 2203/04113*
　　　　　　　　　　　　　　　　(2013.01)

(56)　　　　　　References Cited

U.S. PATENT DOCUMENTS

| | | |
|---|---|---|
| 2009/0121819 A1 | 5/2009 | Haratani et al. |
| 2018/0017598 A1 | 1/2018 | Hebiguchi |
| 2022/0283689 A1 | 9/2022 | Takada et al. |
| 2023/0194744 A1* | 6/2023 | Yamaguchi ............. G06F 3/044 |
| | | 324/663 |
| 2024/0220050 A1 | 7/2024 | Takada et al. |

FOREIGN PATENT DOCUMENTS

| | | |
|---|---|---|
| JP | 2009-111294 A | 5/2009 |
| JP | 2010-044664 A | 2/2010 |
| JP | 2021-086495 A | 6/2021 |
| WO | WO2016/175123 A1 | 11/2016 |

\* cited by examiner

FIG.6

(140 kHz)

LPF (OPTIMIZED AT 200 kHz, INVARIABLE)

FIG.16

DETECTION DEVICE

CROSS-REFERENCE TO RELATED APPLICATION

This application claims the benefit of priority from Japanese Patent Application No. 2023-001905 filed on Jan. 10, 2023 and International Patent Application No. PCT/JP2024/000194 filed on Jan. 9, 2024, the entire contents of which are incorporated herein by reference.

BACKGROUND

1. Technical Field

What is disclosed herein relates to a detection device.

2. Description of the Related Art

Widely known are detection devices that detect proximity of an object (refer to, for example, U.S. Pat. No. 9,151,792). Such a detection device with what is called a hover detection (proximity detection) function includes a plurality of detection electrodes and a shield electrode disposed around a detection region provided with the detection electrodes, and the shield electrode is supplied with electric signals.

To improve the accuracy of hover detection, there has been developed a configuration in which the ground potential of a detection block including a detection circuit is set to a potential that periodically varies in synchronization with signals for detection and the potential is supplied to the shield electrode as the ground potential. In such a configuration, isolators are provided on a power supply path and a signal transmission path coupled to the detection block to electrically isolate the circuits in the detection block from the peripheral circuits that operate with a fixed potential as the ground potential. Examples of the isolator include, but are not limited to, optically isolated photocouplers, magnetically isolated digital isolators, etc. Propagation delay of the isolator, however, may limit the communication speed depending on the path provided with the isolator, resulting in insufficient performance.

For the foregoing reasons, there is a need for a detection device that can reduce the effects of propagation delay of an isolator.

SUMMARY

According to an aspect, a detection device includes: a sensor circuit having a detection region; an AFE circuit configured to acquire a detection signal from the sensor circuit; a control circuit configured to control the AFE circuit; a reference potential generation circuit configured to operate with a first reference potential, which is a fixed potential, as a ground potential and generate a second reference potential synchronized with a square wave signal output from the AFE circuit; a first isolator provided on a transmission path for the square wave signal between the AFE circuit and the reference potential generation circuit; and a second isolator provided on a signal transmission path between an external processing device that is configured to operate with the first reference potential as the ground potential and the control circuit. The AFE circuit and the control circuit operate with the second reference potential as the ground potential, and signal transmission paths between the AFE circuit and the control circuit are electrically coupled to each other.

BRIEF DESCRIPTION OF THE DRAWINGS

FIG. 6 is a schematic of an example of signal waveform change in a reference potential generation circuit;

FIG. 16 is a diagram of an exemplary block configuration of the detection device according to a first embodiment;

DETAILED DESCRIPTION

Figure 1:
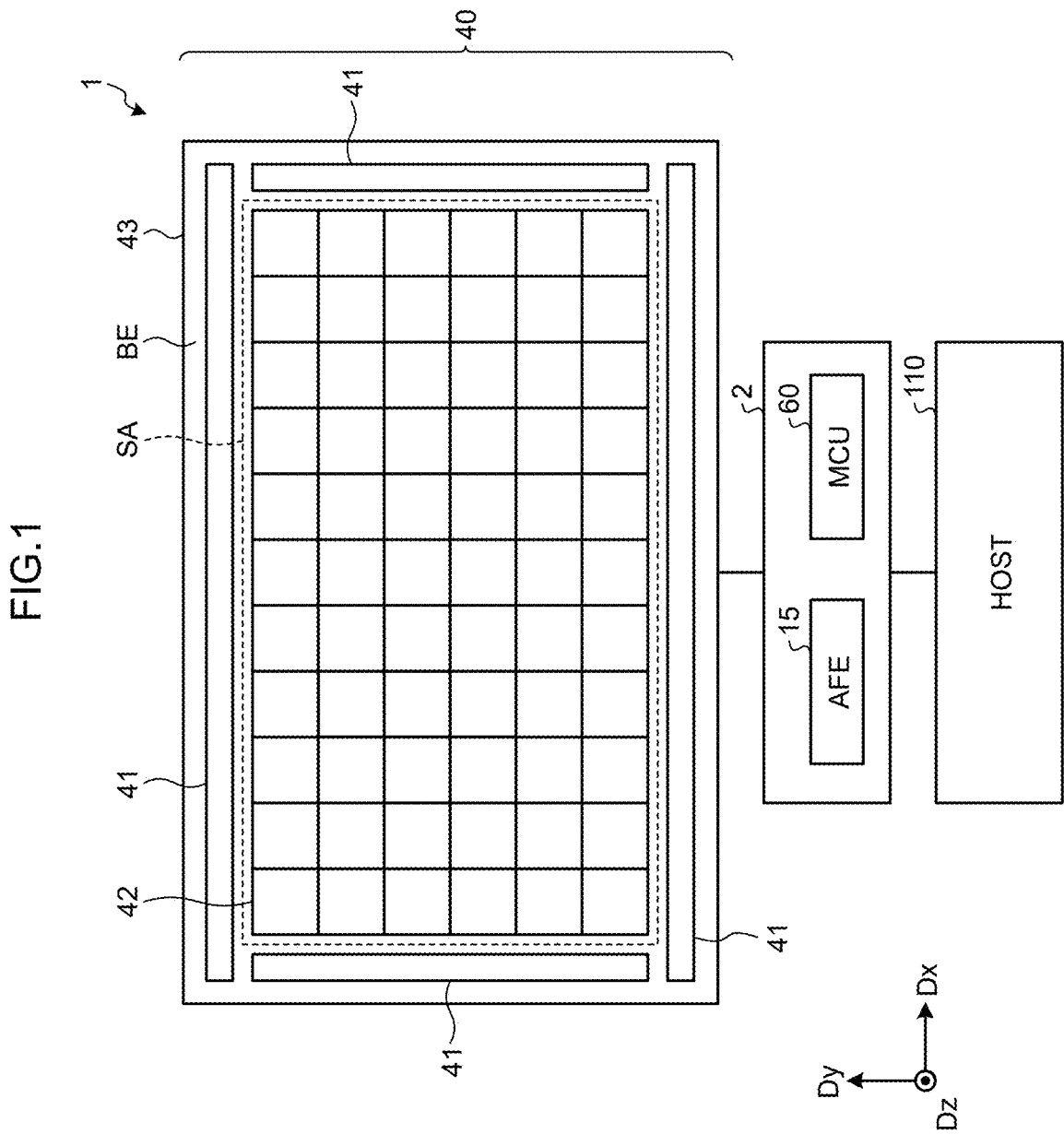
FIG. 1 is a diagram of a main configuration of a detection device according to an embodiment.

Exemplary aspects (embodiments) to embody the present disclosure are described below in greater detail with reference to the accompanying drawings. The contents described in the embodiments below are not intended to limit the present disclosure. Components described below include components easily conceivable by those skilled in the art and components substantially identical therewith. Further- more, the components described below may be appropri- ately combined. What is disclosed herein is given by way of example only, and appropriate modifications made without departing from the spirit of the present disclosure and easily conceivable by those skilled in the art naturally fall within the scope of the present disclosure. To make the explanation more specific, the drawings may possibly illustrate the width, the thickness, the shape, and other elements of each component more schematically than the actual aspect. These elements, however, are given by way of example only and are not intended to limit interpretation of the present dis- closure. In the present specification and the drawings, com- ponents similar to those previously described with reference to previous drawings are denoted by the same reference numerals, and detailed explanation thereof may be omitted as appropriate.

In the present specification and the claims, when the term "on" is used to describe an aspect where a first structure is disposed on a second structure, it includes both of the following cases unless otherwise noted: a case where the first structure is disposed directly on and in contact with the second structure, and a case where the first structure is disposed on the second structure with still another structure interposed therebetween.

FIG. 1 is a diagram of a main configuration of a detection device 1 according to an embodiment. As illustrated in FIG. 1, the detection device 1 includes a sensor circuit 40 and a detection circuit 2.

The sensor circuit 40 is provided with a plurality of sensor electrodes (first electrodes) 42 and a peripheral electrode (second electrode) 41 on a substrate 43. The detection device 1 is a hover detection device that detects the position and movement of an object to be detected, such as a finger, when the object to be detected is not in contact with the detection surface of the sensor circuit 40 (hereinafter also referred to as "hover detection"). The detection device 1 according to the present disclosure performs self-capacitance hover detection.

The sensor circuit 40 has a detection region SA and a peripheral region BE outside the detection region SA. The detection region SA is a region provided with the sensor electrodes 42 to detect the object to be detected that is in proximity to the detection surface. The peripheral region BE is a region positioned outside the detection region SA and not provided with the sensor electrodes 42. The peripheral region BE is a region provided with the peripheral electrodes 41 along the four sides of the detection region SA.

In the following description, a first direction Dx is one direction in a plane parallel to the substrate 43. A second direction Dy is one direction in the plane parallel to the substrate 43 and is orthogonal to the first direction Dx. The second direction Dy may intersect the first direction Dx without being orthogonal thereto. A third direction Dz is a direction orthogonal to the first direction Dx and the second direction Dy and is normal to the main surface of the substrate 43. The term "plan view" refers to the positional relation when viewed in a direction perpendicular to the substrate 43.

A plurality of sensor electrodes 42 are disposed in a matrix (row-column configuration) in the detection region SA of the substrate 43. In other words, the sensor electrodes 42 are adjacently arrayed in the first direction Dx and the second direction Dy. The sensor electrodes 42 are each electrically coupled to an AFE circuit 15 via wiring (not illustrated).

The peripheral electrodes 41 are disposed surrounding the sensor electrodes 42 provided in the detection region SA.

The sensor circuit 40 is coupled to the detection circuit 2. The detection circuit 2 includes an AFE circuit 15, a control circuit 60, and other components. The AFE circuit 15 performs hover detection based on the output from the sensor circuit 40. The control circuit 60 controls the hover detection operation performed by the AFE circuit 15. The AFE circuit 15 is an analog front-end (AFE) circuit, for example. The control circuit 60 includes a micro control unit (MCU), for example.

The detection circuit 2 is coupled to a processing device (external processing device) 110. The processing device 110 functions as a host computer (HOST) of the detection device 1 according to the embodiment. The processing device 110 is a point of sale (POS) cash register terminal, for example. The processing device 110 is not limited thereto and may be any terminal device that can accept hover operations on the detection device 1.

Figure 2A:
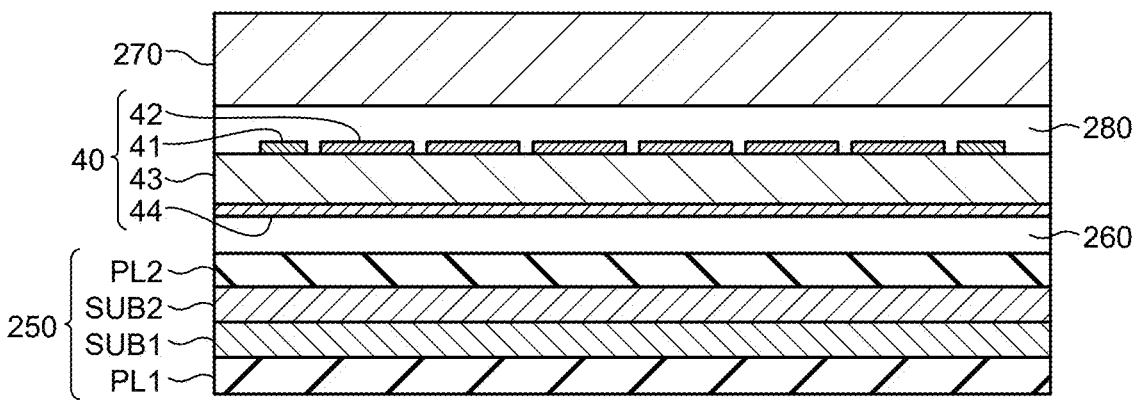
FIG. 2A is a schematic of an exemplary schematic sectional configuration in which a sensor circuit of the detection device according to the embodiment is stacked on a display panel.
Figure 3:
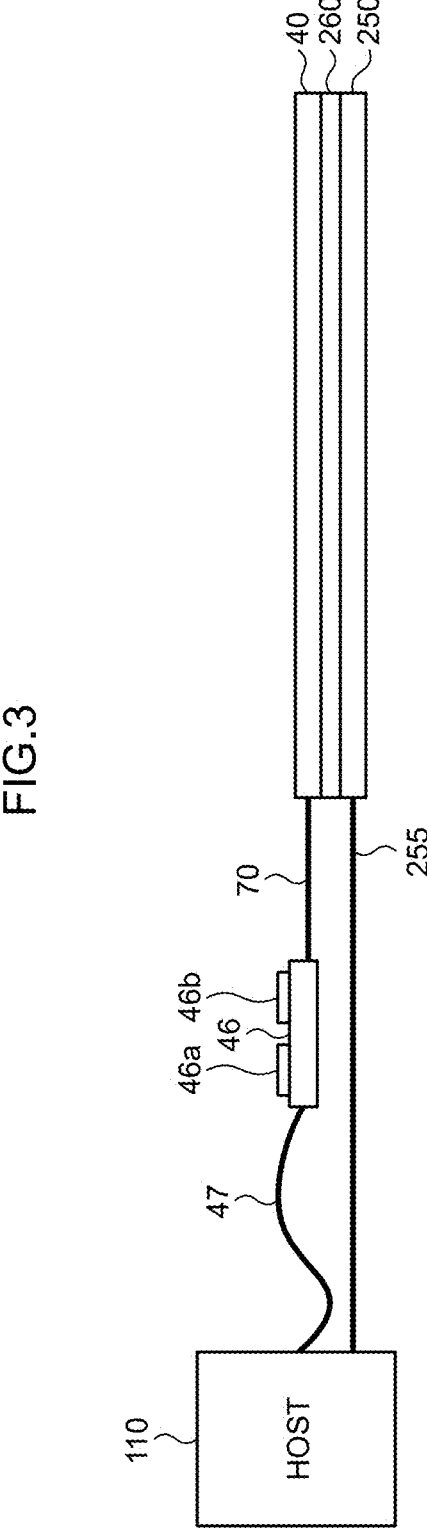
FIG. 3 is a schematic of a first coupling example between the sensor circuit of the detection device according to the embodiment and the display panel.

FIG. 2A is a schematic of an exemplary schematic sec- tional configuration in which the sensor circuit 40 of the detection device 1 according to the embodiment is stacked on a display panel 250. The display panel 250 is a display panel that displays and outputs images. FIG. 3 is a schematic of a first coupling example between the sensor circuit 40 of the detection device 1 according to the embodiment and the display panel 250. FIG. 3 illustrates an example of what is called an on-cell device in which the sensor circuit 40 of the detection device 1 according to the embodiment is mounted on the display panel 250.

The display panel 250 includes an array substrate SUB1, a counter substrate SUB2, a first polarizing plate PL1, and a second polarizing plate PL2. The first polarizing plate PL1, the array substrate SUB1, the counter substrate SUB2, and the second polarizing plate PL2 are stacked in this order.

The array substrate SUB1 is a drive circuit substrate for driving a plurality of pixels. The counter substrate SUB2 is provided facing the array substrate SUB1. A liquid crystal layer serving as a display function layer is provided between the array substrate SUB1 and the counter substrate SUB2.

The sensor circuit 40 is bonded to the top of the display panel 250 with an adhesive layer 260 interposed therebe- tween. The adhesive layer 260 is an optical clear adhesive (OCA), for example.

The sensor electrodes 42 and the peripheral electrode 41 are provided on the same substrate 43. The substrate 43 is a film- or plate-like member made of insulating material and is a resin film or a glass substrate, for example. The sensor electrodes 42 and the peripheral electrode 41 are not nec- essarily provided in the same layer of the substrate 43 and may be provided in different layers of the substrate 43. The sensor electrode 42 is made of translucent conductive mate- rial, such as indium tin oxide (ITO) and indium zinc oxide (IZO). The peripheral electrode 41 may be made of the same material as that of the sensor electrode 42 or material, such as metal material, different from that of the sensor electrode 42.

A cover member 270 is provided on the sensor circuit 40 with an adhesive layer 280 interposed therebetween. The adhesive layer 280 is an OCA, for example. A shield electrode 44 is provided on the surface of the substrate 43 opposite to the surface provided with the sensor electrodes 42 and the peripheral electrode 41. In other words, the shield electrode 44 is provided between the display panel 250 and the surface of the sensor circuit 40 opposite to the surface provided with the cover member 270. The adhesive layer 260 is in contact with the shield electrode 44 provided to the sensor circuit 40.

The shield electrode 44 contains translucent conductive oxide, such as ITO and IZO, or metal, for example. Examples of the metal include, but are not limited to, molybdenum, tungsten, tantalum, aluminum, copper, etc. (0-valent metal) The shield electrode 44 may have a single-layered or multilayered structure. The shield electrode 44 that has a multilayered structure may include an oxide-containing layer and a metal-containing layer. The shield electrode 44 simply needs to be a transparent and conductive layer and can be called a transparent conductive layer.

The shield electrode 44 is supplied with a second reference potential, which will be described later. The shield electrode 44 is also supplied with the same signal as that supplied to the peripheral electrode 41. The shield electrode 44 provided between the sensor circuit 40 and the display panel 250 can block noise output from the display panel 250 and superimposed on the sensor electrodes 42 of the sensor circuit 40.

The cover member 270 is bonded to the top of the sensor circuit 40. The cover member 270 is a glass substrate or a resin substrate, for example. The upper surface of the cover member 270 serves as the detection surface in hover detection.

Figure 2B:
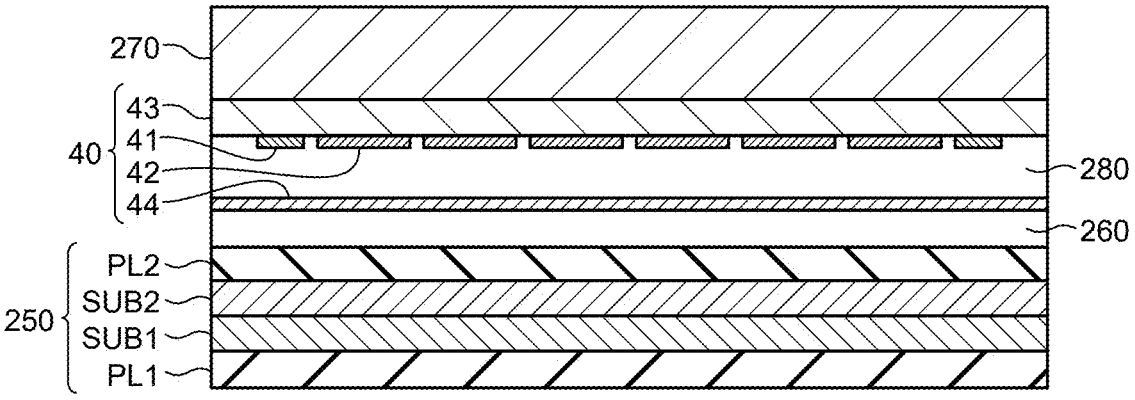
FIG. 2B is a schematic of a modification of the schematic sectional configuration illustrated in FIG. 2A.

Instead of the schematic sectional configuration illustrated in FIG. 2A, the schematic sectional configuration illustrated in FIG. 2B may be employed. FIG. 2B is a schematic of a modification of the schematic sectional configuration illustrated in FIG. 2A.

The display panel 250 is a liquid crystal display (LCD) panel, for example. In this case, a backlight is provided on the side opposite to the sensor circuit 40 across the display panel 250. The display panel 250 is not limited thereto and may be an organic light-emitting diode (OLED) display panel or an inorganic EL display panel (micro-LED or mini-LED), for example. Alternatively, the display panel 250 may be an electrophoretic display (EPD) panel including electrophoretic elements as display elements.

In what is called an on-cell device configuration illustrated in FIG. 3, the detection device 1 includes a flexible printed circuit (FPC) 70. The FPC 70 is coupled to a printed circuit board (PCB) 46. The PCB 46 is provided with various circuits constituting the detection circuit 2. FIG. 3 illustrates circuits 46a and 46b as an example of the various circuits constituting the detection circuit 2. The circuits 46a and 46b are circuits that function as the AFE circuit 15 and the control circuit 60, for example.

The display panel 250 includes an FPC 255. The FPC 255 is provided with various circuits related to the operations of the display panel 250. The PCB 46 is coupled to the processing device 110 via a cable 47. The cable 47 has a function of transmitting signals generated between the detection device 1 and the processing device 110. The cable 47 is a universal serial bus (USB) cable, for example.

Figure 4:
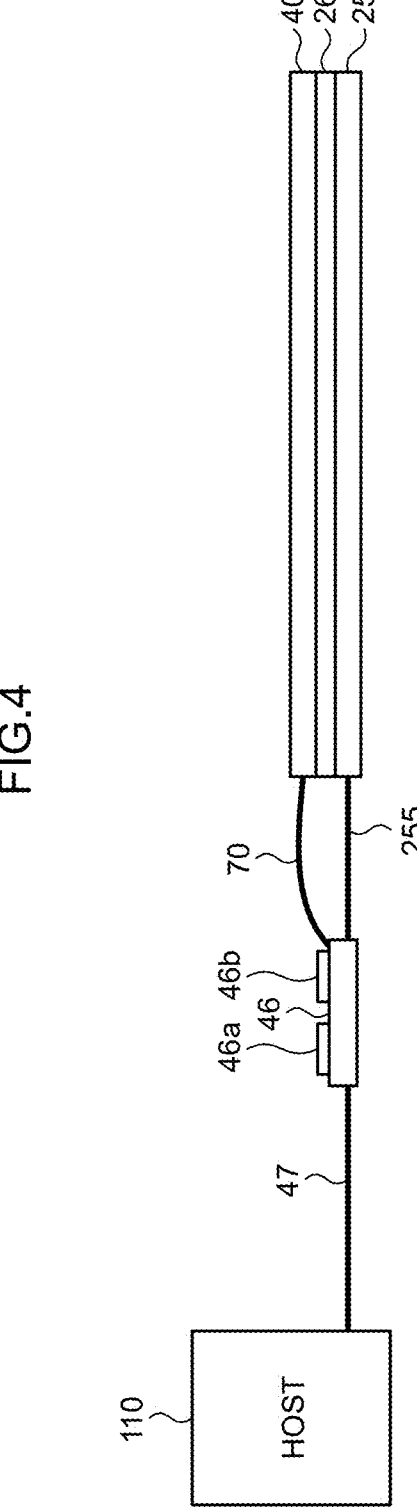
FIG. 4 is a schematic of a second coupling example between the sensor circuit of the detection device according to the embodiment and the display panel.

FIG. 4 is a schematic of a second coupling example between the sensor circuit 40 of the detection device 1 according to the embodiment and the display panel 250. FIG. 4 illustrates an example of what is called an in-cell or hybrid device in which the sensor circuit 40 of the detection device 1 according to the embodiment is incorporated and integrated with the display panel 250. Incorporating and integrating the sensor circuit 40 of the detection device 1 according to the embodiment with the display panel 250 includes, for example, using some components, such as substrates and electrodes, as components for both the display panel 250 and the sensor circuit 40 of the detection device 1 according to the embodiment.

In what is called an in-cell or hybrid device configuration illustrated in FIG. 4, the FPC 255 is coupled to the PCB 46. In this case, the cable 47 further has a function of transmitting signals generated between the display panel 250 and the processing device 110.

First Embodiment

Figure 5:
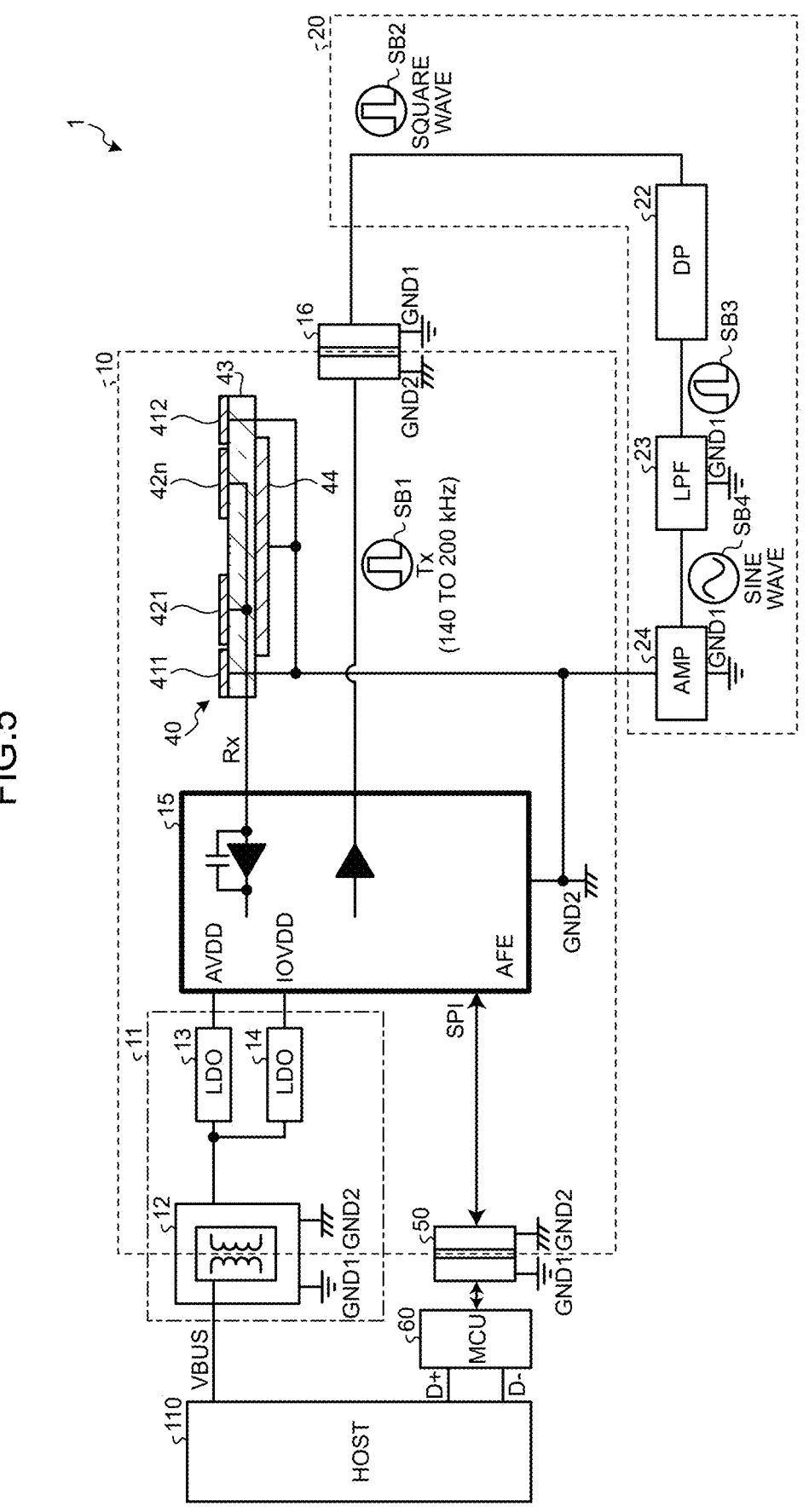
FIG. 5 is a diagram of an exemplary block configuration of the detection device according to the embodiment.

Before explaining a specific configuration of the detection device 1 according to a first embodiment, the configuration and operations of the detection device according to the embodiment is explained. FIG. 5 is a diagram of an exemplary block configuration of the detection device 1 according to the embodiment.

As illustrated in FIG. 5, the detection device 1 includes a reference potential generation circuit 20, a first isolator 16, a second isolator 50, and a power supply circuit 11 besides the sensor circuit 40, the AFE circuit 15, and the control circuit 60 described above. The sensor circuit 40 and the AFE circuit 15 according to the present disclosure are included in a detection block 10. The control circuit 60 and the reference potential generation circuit 20 operate with a first reference potential GND1, which is a fixed potential, as the ground potential. The circuits including the sensor circuit 40 and the AFE circuit 15 in the detection block 10 operate with a second reference potential GND2 generated by the reference potential generation circuit 20 as the ground potential.

The power supply circuit 11 includes an isolated DC-DC converter 12 and linear regulators (LDOs) 13 and 14. The linear regulators 13 and 14 are included in the detection block 10.

The isolated DC-DC converter 12 isolates the processing device 110 from the detection block 10 and supplies, to the detection block 10, electric power supplied from a power supply line VBUS of a USB cable, for example.

The isolated DC-DC converter 12 is provided to a power supply path from the external device (processing device 110) that operates with the first reference potential as the ground potential. The source for supplying electric power to the isolated DC-DC converter 12 is not limited to the processing device 110. The isolated DC-DC converter 12 may be supplied with electric power from an AC adapter or other external power sources, for example.

In the isolated DC-DC converter 12, electric power is supplied to the coil on the processing device 110 side, thereby causing the coil to generate a magnetic field. The coil on the detection block 10 side is provided within a region of being affected by the magnetic field generated by the coil on the processing device 110 side.

The coil on the detection block 10 side generates an induced electromotive force due to the magnetic field generated by the coil on the processing device 110 side. The electric power generated by the coil on the detection block 10 side is converted into a voltage with the second reference potential GND2 as the ground potential and output to the linear regulators 13 and 14.

The linear regulators 13 and 14 are interposed between the isolated DC-DC converter 12 and the AFE circuit 15 to adjust the voltage to be output to the AFE circuit 15 to a more appropriate voltage.

The linear regulator 13 operates with the second reference potential GND2 as the ground potential and outputs a voltage required as an analog power supply AVDD for the AFE circuit 15.

The linear regulator 14 operates with the second reference potential GND2 as the ground potential and outputs a voltage required as an input/output power supply IOVDD for the AFE circuit 15.

The AFE circuit 15 generates drive signals for self-capacitance hover detection and outputs them to the sensor electrodes 42.

The AFE circuit 15 according to the present disclosure generates a square wave signal Tx and outputs it to the reference potential generation circuit 20 via the first isolator 16. The square wave signal Tx is a signal obtained by amplifying the drive signal output to the sensor electrodes 42. The frequency of the drive signal for self-capacitance hover detection (hereinafter also referred to as "drive frequency") is substantially the same as the fundamental frequency of the square wave signal Tx. The square wave signal Tx contains fundamental frequency components and harmonic components of the drive signal that is output to the sensor electrodes 42.

The first isolator 16 isolates the reference potential generation circuit 20 from the detection block 10 and transmits the square wave signal Tx output from the AFE circuit 15.

Specifically, the square wave signal with the first reference potential GND1 (fixed potential) as the ground potential, which is output from the terminal on the reference potential generation circuit 20 side of the first isolator 16, is synchronized with the square wave signal Tx with the second reference potential GND2 as the ground potential, which is output from the AFE circuit 15. In FIG. 5, the waveform of the square wave signal Tx output from the AFE circuit 15 is schematically illustrated as a waveform SB1, and the waveform of the square wave signal output to the reference potential generation circuit 20 via the first isolator 16 is schematically illustrated as a waveform SB2.

Signal transmission between the detection block 10 side and the reference potential generation circuit 20 side in the first isolator 16 is performed by an optical isolation method using a photocoupler, for example. Signal transmission between the detection block 10 side and the reference potential generation circuit 20 side in the first isolator 16 is not necessarily performed by an optical isolation method and may be performed by, for example, a magnetic isolation method based on the same principle as the isolated DC-DC converter 12 or a capacitive isolation method using the principle of a capacitor.

The AFE circuit 15 transmits and receives signals, such as sensing data and various control commands, to and from the control circuit 60 via the second isolator 50. Specifically, the AFE circuit 15 outputs the sensing data indicating the detection results of hover detection to the control circuit 60 via the second isolator 50, for example.

Signals between the AFE circuit 15 and the control circuit 60 according to the present disclosure are transmitted by a serial peripheral interface (SPI), which is a clock synchronous serial interface. The serial interface for transmitting the signals between the AFE circuit 15 and the control circuit 60 is not limited to SPI.

The second isolator 50 isolates the control circuit 60 from the detection block 10 and transmits signals between the AFE circuit 15 and the control circuit 60.

Specifically, the electrical signal with the first reference potential GND1 (fixed potential) as the ground potential, which is output from the terminal on the control circuit 60 side of the second isolator 50, is synchronized with the electrical signal with the second reference potential GND2 as the ground potential, which is output from the detection block 10.

The electrical signal with the second reference potential GND2 as the ground potential, which is output from the terminal on the detection block 10 side of the second isolator 50, is synchronized with the electrical signal with the first reference potential GND1 (fixed potential) as the ground potential, which is output from the control circuit 60.

The method of signal transmission between the control circuit 60 side and the detection block 10 side in the second isolator 50 may be the same as or different from the method of signal transmission between the detection block 10 side and the reference potential generation circuit 20 side in the first isolator 16 described above. In other words, examples of the second isolator 50 include, but are not limited to, an optically isolated photocoupler, a magnetically isolated digital isolator, etc. The second isolator 50 can perform bidirectional transmission, that is, transmission output from the control circuit 60 side to the detection block 10 side and transmission output from the detection block 10 side to the control circuit 60 side. If an optically isolated photocoupler is used as the second isolator 50, a photocoupler that performs transmission output from the control circuit 60 side to the detection block 10 side is coupled in parallel with a photocoupler that performs transmission output from the detection block 10 side to the control circuit 60 side.

The control circuit 60 transmits and receives signals, such as various kinds of information on sensing data and control commands, to and from the processing device 110.

Based on reference information (DP control reference data) the control circuit 60 outputs an electrical resistance setting command to the digital potentiometer 22. The reference information (DP control reference data) indicates the correspondence between the fundamental frequency of the square wave signal Tx output from the AFE circuit 15 and the electrical resistance of a digital potentiometer 22, which will be described later. The electrical resistance setting command is a command to set the electrical resistance of the digital potentiometer 22 to an electrical resistance corresponding to the fundamental frequency of the square wave signal Tx output from the AFE circuit 15. As a result, the electrical resistance of the digital potentiometer 22 is controlled to the electrical resistance corresponding to the fundamental frequency of the square wave signal Tx.

The control circuit 60 also performs noise determination on the sensing data and position determination (coordinate calculation) of the object to be detected, based on the sensing data. The noise determination is processing performed to determine the amount of noise components in the sensing data. The coordinate calculation is arithmetic processing performed to determine the position of the object to be detected that is in proximity to the sensor circuit 40. Specifically, the coordinate calculation can derive the position in the first direction Dx, the position in the second direction Dy, and the position in the third direction Dz (refer to FIG. 1) of the object to be detected that is in proximity to the sensor circuit 40, for example. Detailed explanation of the noise determination and the coordinate calculation is omitted herein because they are the same as those well-known.

Signals between the control circuit 60 and the processing device 110 according to the present disclosure are transmitted by USB, which is a serial interface. Specifically, the signals between the control circuit 60 and the processing device 110 are transmitted via signal lines D+ and D− of a USB cable. The serial interface for transmitting the signals between the control circuit 60 and the processing device 110 is not limited to USB.

In the configuration described above, the linear regulators 13 and 14, the AFE circuit 15, and the sensor circuit 40 included in the detection block 10 are electrically isolated from other components coupled via the isolated DC-DC converter 12, the first isolator 16, and the second isolator 50.

The processing device 110 side of the isolated DC-DC converter 12, the reference potential generation circuit 20 side of the first isolator 16, and the control circuit 60 side of the second isolator 50 are supplied with the first reference potential GND1 serving as the ground potential. The first reference potential GND1 is a fixed potential held by a large electrode, such as a solid electrode. Instead of the isolated DC-DC converter 12, the configuration may include a magnetically isolated isolator and a DC-DC converter.

In contrast thereto, the detection block 10 side of the isolated DC-DC converter 12, the detection block 10 side of the first isolator 16, and the detection block 10 side of the second isolator 50 are supplied with the second reference potential GND2 serving as the ground potential. The second reference potential GND2 is a periodically varying potential generated by the reference potential generation circuit 20.

The variation period of the periodically varying potential (second reference potential GND2) is the same as the square wave generation period of the drive signal generated by the AFE circuit 15 (square wave period of the square wave signal Tx). In other words, the periodically varying potential (second reference potential GND2) is a potential that periodically varies in synchronization with the drive signal (square wave signal Tx) generated by the AFE circuit 15.

Next, the reference potential generation circuit 20 is described.

The reference potential generation circuit 20 includes a digital potentiometer (DP) 22, a low-pass filter (LPF) 23, and an amplifier (AMP) 24. The digital potentiometer 22, the low-pass filter 23, and the amplifier 24 operate with the first reference potential GND1, which is a fixed potential, as the ground potential.

The digital potentiometer 22 generates an intermediate wave signal based on the square wave signal output from the AFE circuit 15 via the first isolator 16. The digital potentiometer 22 is a digital potentiometer circuit (DP circuit) provided on the output transmission path for the square wave signal output from the AFE circuit 15 via the first isolator 16 and generates the electrical resistance of an electrical resistance value corresponding to the command from the processing device 110. With the electrical resistance generated by the digital potentiometer 22, the square wave signal output from the AFE circuit 15 via the first isolator 16 is converted into an intermediate wave signal, which will be described later. In FIG. 5, the waveform of the intermediate wave signal output from the digital potentiometer 22 is schematically illustrated as a waveform SB3.

The low-pass filter 23 removes high-frequency components from the intermediate wave signal output from the digital potentiometer 22. Specifically, the low-pass filter 23 is a Sallen-Key fourth-order active filter, for example.

The low-pass filter 23 removes the high-frequency components from the intermediate wave signal and outputs a signal having a substantially square waveform in which the waveform gradually changes. This can prevent the amplifier 24 in the subsequent stage from amplifying unnecessary noise components and increasing radiation noise. More preferably, the signal output from the low-pass filter 23 has a substantially sinusoidal waveform. In FIG. 5, the waveform of the substantially sinusoidal output signal output from the low-pass filter 23 is schematically illustrated as a waveform SB4. The substantially sinusoidal wave is defined herein as a sine wave and a wave with a waveform having the effect of noise substantially equivalent to that of a sine wave.

The amplifier 24 is an inverting amplifier circuit that inverts, amplifies, and impedance-converts the substantially sinusoidal output signal that is output from the low-pass filter 23. The signal inverted and amplified by the amplifier 24 is supplied as the second reference potential (GND2) serving as the ground potential of the circuits in the detection block 10. The second reference potential (GND2) is supplied to peripheral electrodes 411 and 412 and the shield electrode 44 of the sensor circuit 40. The amplifier 24 may perform or not perform polarity inversion depending on the polarity of the signal that is input to the amplifier 24.

Figure 6:
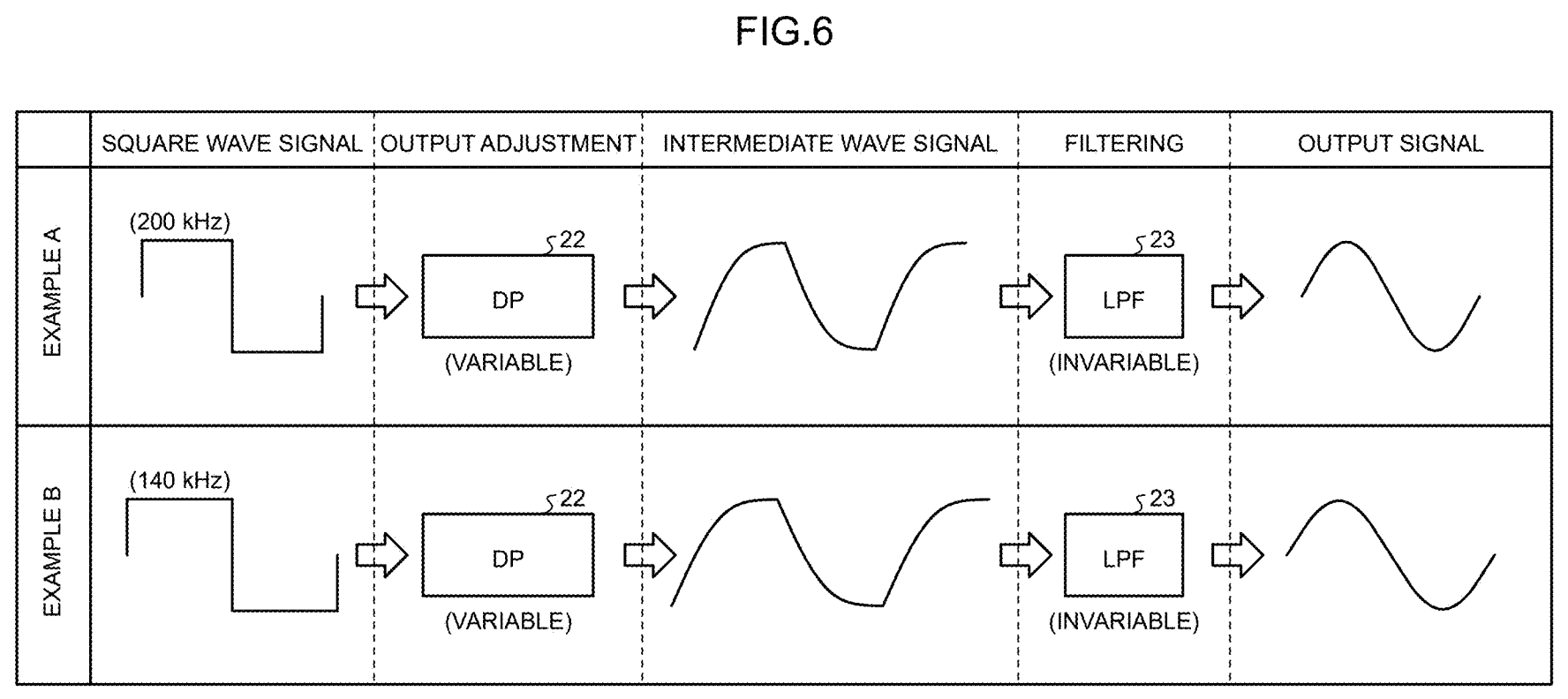

FIG. 6 is a schematic of an example of signal waveform change in the reference potential generation circuit 20. The square wave signal output from the AFE circuit 15 is converted into an intermediate wave signal by the electrical resistance of the digital potentiometer 22. The intermediate wave signal is converted into a substantially sinusoidal output signal by the low-pass filter 23.

The AFE circuit 15 according to the present disclosure has a function of setting the fundamental frequency of the square wave signal Tx within a range of 140 kHz to 200 kHz. Example A in FIG. 6 illustrates the case where the fundamental frequency of the square wave signal Tx is 200 KHz. Example B in FIG. 6 illustrates the case where the fundamental frequency of the square wave signal Tx is 140 kHz. The frequency setting range (140 kHz to 200 kHz) of the square wave signal Tx in the AFE circuit 15 is given by way of example only, and the present embodiment is not limited thereto.

Figure 7:
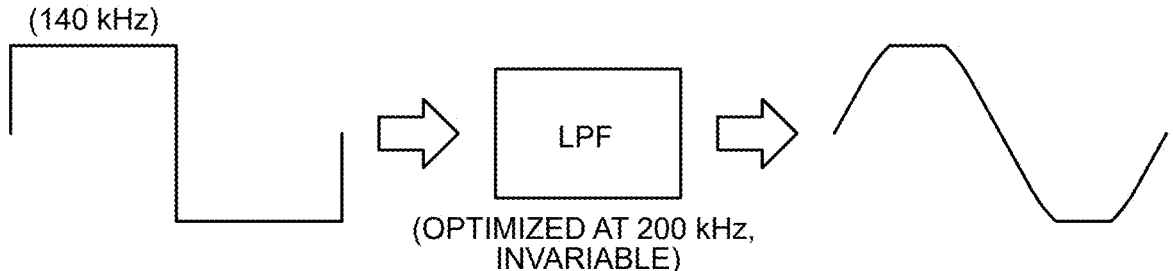
FIG. 7 is a schematic of an example of the function of a low-pass filter.

FIG. 7 is a schematic of an example of the function of a low-pass filter. Typically, when a low-pass filter is used to generate a substantially sinusoidal signal from a square wave signal, it is optimized to a single frequency. Specifically, when a square wave signal of 140 kHz is input to a low-pass filter optimized at 200 kHz, for example, the signal waveform may have distortion in a time-series change in signal intensity near the peak of the signal output from the low-pass filter as illustrated in FIG. 7.

In contrast thereto, the electrical resistance of the digital potentiometer 22 according to the present disclosure is controlled to be a value corresponding to the fundamental frequency of the square wave signal Tx output from the AFE circuit 15. Therefore, the detection device 1 can generate a substantially sinusoidal output signal in which the distortion in a time-series change in signal intensity near its peak is suppressed as illustrated in FIG. 6.

Figure 8:
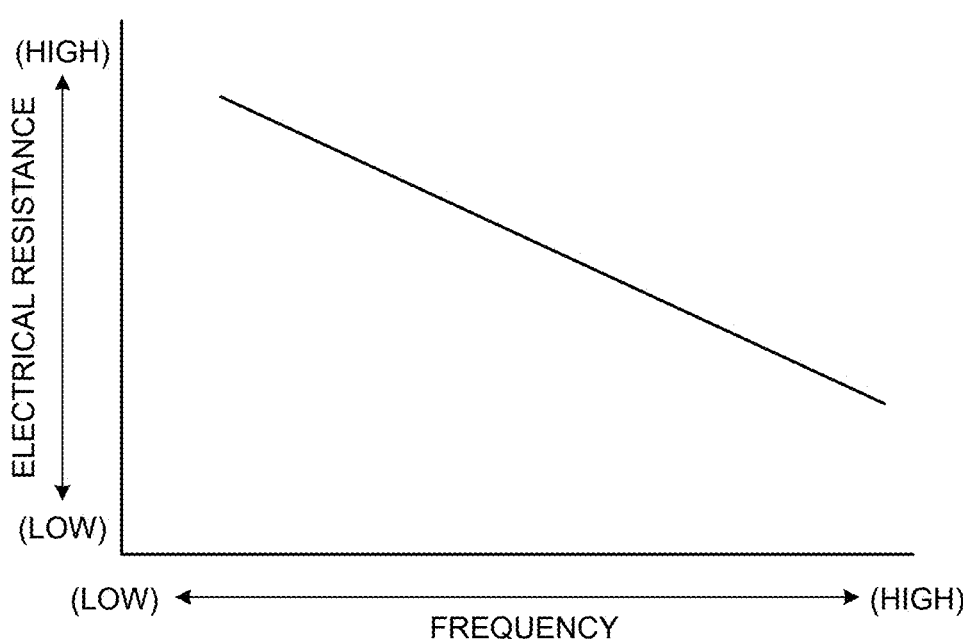
FIG. 8 is a graph schematically illustrating the frequency characteristics of an electrical resistance of a digital potentiometer.

FIG. 8 is a graph schematically illustrating the frequency characteristics of the electrical resistance of the digital potentiometer 22. The horizontal axis in FIG. 8 indicates the fundamental frequency of the square wave signal Tx, and the vertical axis indicates the electrical resistance of the digital potentiometer 22. FIG. 8 illustrates an example where the electrical resistance of the digital potentiometer 22 is controlled to be higher as the fundamental frequency of the square wave signal Tx is lower, and the electrical resistance is controlled to be lower as the fundamental frequency of the square wave signal Tx is higher. By controlling the electrical resistance of the digital potentiometer 22 based on the fundamental frequency of the square wave signal Tx, the low-pass filter 23 in the subsequent stage can stably generate a substantially sinusoidal output signal.

In the block configuration illustrated in FIG. 5, the sensor circuit 40 includes a plurality of sensor electrodes 421, . . . , and 42n (n is a natural number), the peripheral electrodes 411 and 412, the substrate 43, and the shield electrode 44. The peripheral electrodes 411 and 412 and the sensor electrodes 421, . . . , and 42n are electrodes adjacently disposed on the substrate 43. The shield electrode 44 is a film- or plate-like electrode facing the sensor electrodes 421, . . . , and 42n with the substrate 43 interposed therebetween. The peripheral electrodes 411 and 412 and the shield electrode 44 function as an active shield the potential of which periodically varies corresponding to changes in the second reference potential (GND2) supplied from the reference potential generation circuit 20.

As illustrated in FIG. 5, the AFE circuit 15 is coupled to the sensor electrodes 421, . . . , and 42n. The self-capacitance of each of the sensor electrodes 421, . . . , and 42n causes the sensor electrode to output an electrical signal to the AFE circuit 15. Therefore, the AFE circuit 15 acquires the electrical signal generated corresponding to the self-capacitance of each of the sensor electrodes 421, . . . , and 42n as a detection signal Rx indicating the state of the sensor circuit 40. The region provided with the sensor electrodes 421, . . . , and 42n functions as the detection region SA (refer to FIG. 1). The sensor electrodes 421, . . . , and 42n in the detection region SA function as the detection electrodes in hover detection. The peripheral electrodes 411 and 412 disposed around the detection region SA function as the shield electrodes in hover detection.

Figure 9:
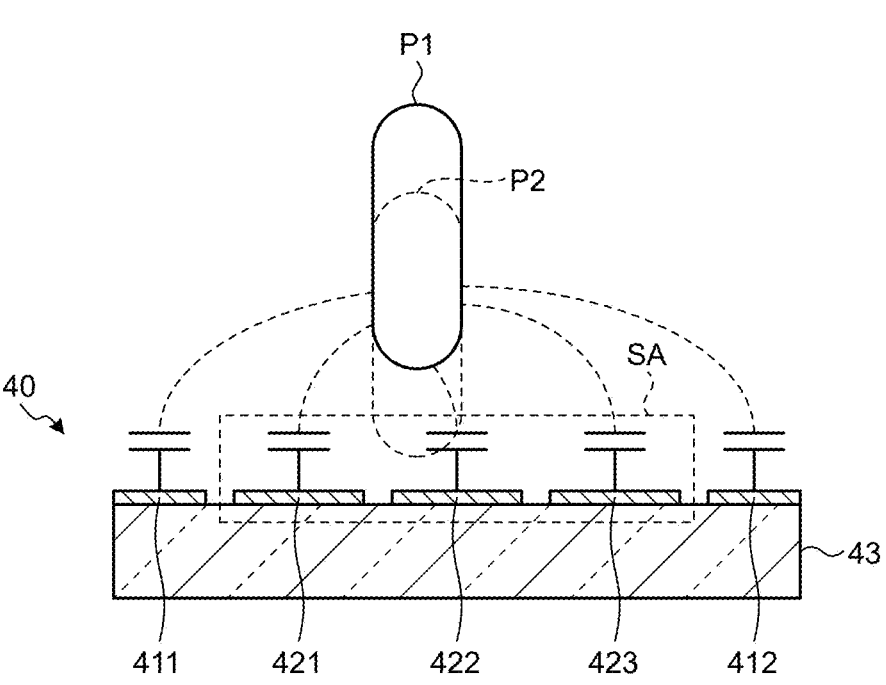
FIG. 9 is a schematic of a flow of electricity in an electric field generated when the potential of peripheral electrodes is higher than that of sensor electrodes.
Figure 10:
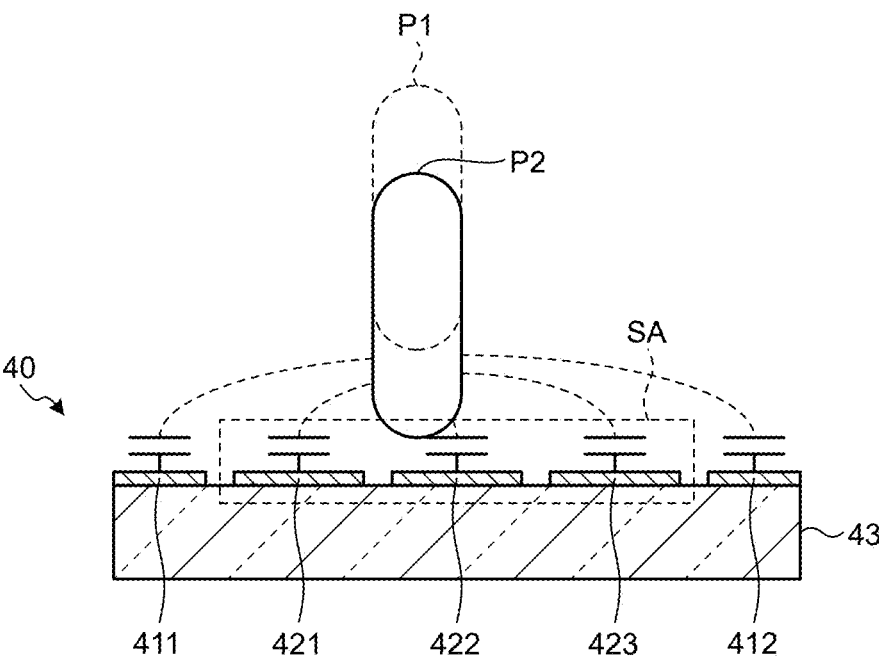
FIG. 10 is a schematic of a flow of electricity in an electric field generated when the potential of the peripheral electrodes is lower than that of the sensor electrodes.

FIG. 9 is a schematic of a flow of electricity in an electric field generated when the potential of the peripheral electrode 41 is higher than that of the sensor electrodes 42. FIG. 10 is a schematic of a flow of electricity in an electric field generated when the potential of the peripheral electrode 41 is lower than that of the sensor electrodes 42. The detection signal intensity acquired from each of the sensor electrodes 421, 422, and 423 differs between when an object in proximity to the sensor circuit 40 is at a position P1 and when it is at a position P2.

Figure 11:
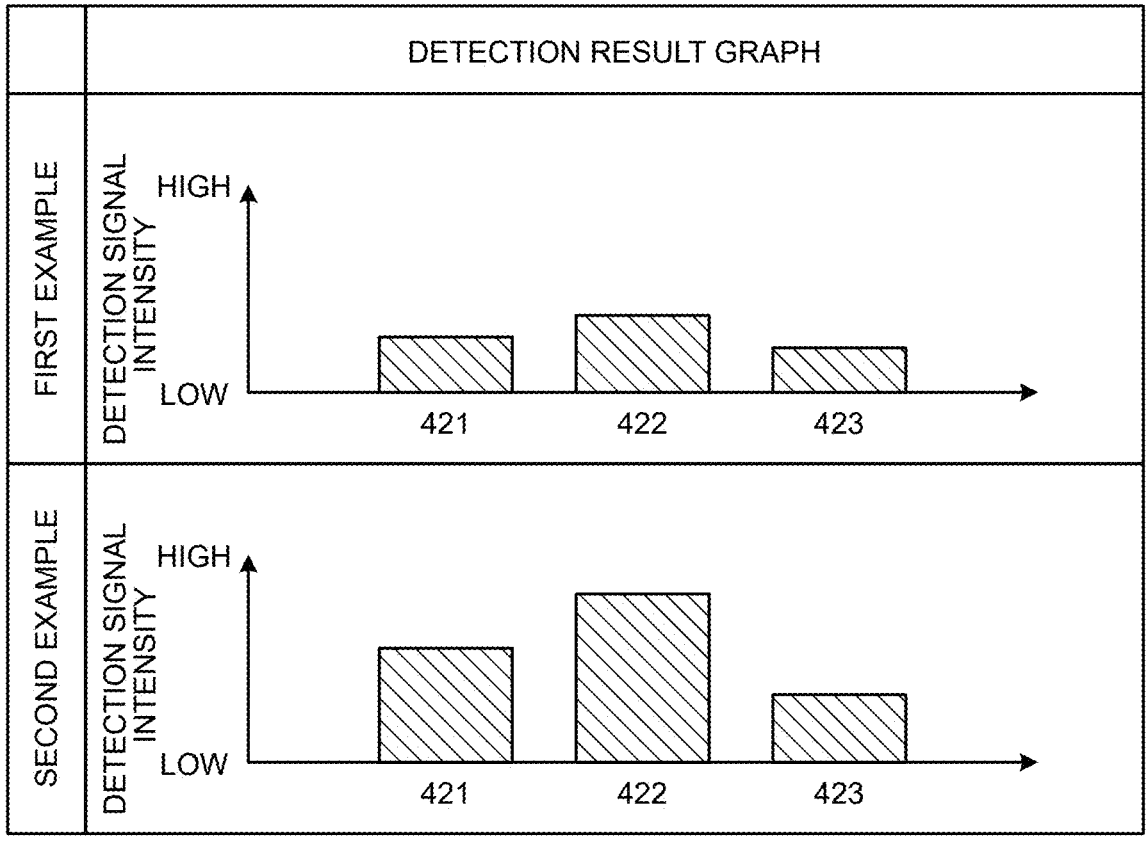
FIG. 11 is a schematic graph indicating an example of detection signal intensity acquired from each of the sensor electrodes.

FIG. 11 is a schematic graph indicating an example of the detection signal intensity acquired from each of the sensor electrodes 421, 422, and 423. The first example illustrated in FIG. 11 is a graph indicating the detection signal intensity acquired from each of the sensor electrodes 421, 422, and 423 when the object to be detected is at the position P1. The second example illustrated in FIG. 11 is a graph indicating the detection signal intensity acquired from each of the sensor electrodes 421, 422, and 423 when the object to be detected is at the position P2.

The AFE circuit 15 detects the degree of proximity to the sensor circuit 40 by the object to be detected, based on the relation between the detection signal intensity acquired from each of the sensor electrodes 421, . . . , and 42n (e.g., sensor electrodes 421, 422, and 423) and the amplitude supplied to the peripheral electrodes 411 and 412. Thus, the degree of proximity to the sensor circuit 40 by the object to be detected can be detected in hover detection. The amplitude supplied to the peripheral electrodes 411 and 412 described above refers to the amplitude supplied to the peripheral electrodes 411 and 412 at the timing when the detection signal, indicating the detection signal intensity acquired from each of the sensor electrodes 421, . . . , and 42n, is acquired.

In the present disclosure, the second reference potential (GND2) is supplied as the ground potential of the AFE circuit 15 as described above. Therefore, the AFE circuit 15 can acquire information indicating the potential of the peripheral electrodes 411 and 412 at the timing of acquiring the detection signals from the sensor electrodes 421, . . . , and 42n, based on the input to the second reference potential (GND2). With this configuration, the detection device 1 can also detect whether the object to be detected enters the electric field generated between the peripheral electrodes 411 and 412 and the sensor electrodes 421, . . . , and 42n.

Figure 12:
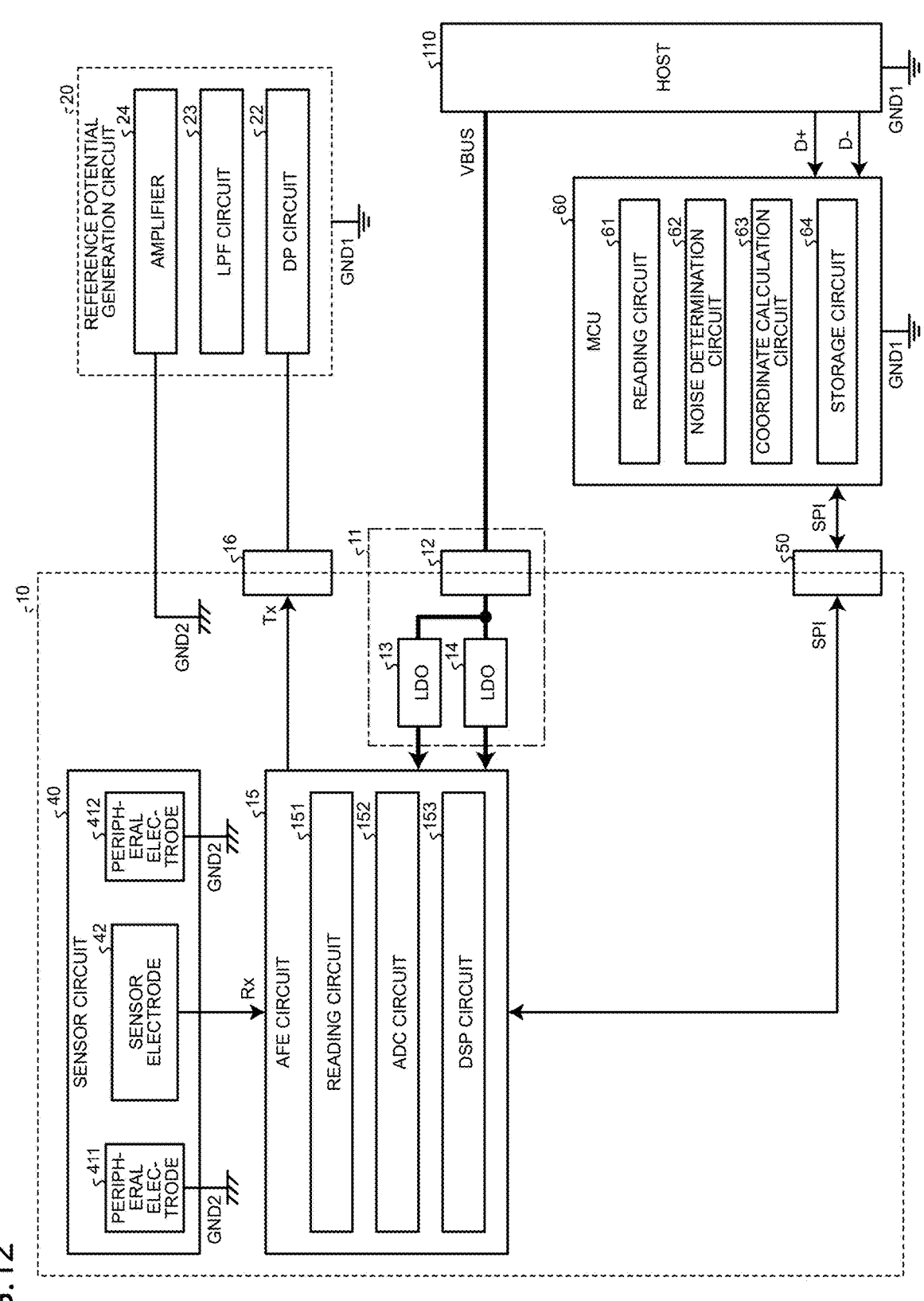
FIG. 12 is a diagram of an exemplary functional circuit block configuration of the detection device according to the embodiment.

FIG. 12 is a diagram of an exemplary functional circuit block configuration of the detection device according to the embodiment.

As illustrated in FIG. 12, the AFE circuit 15 includes a reading circuit 151, an analog digital converter (ADC) circuit 152, and a digital signal processor (DSP) circuit 153. Each of the circuit elements of the AFE circuit 15 operates with the second reference potential GND2, which is a periodically varying potential generated by the reference potential generation circuit 20, as the ground potential.

The reading circuit 151 acquires the detection signals Rx from the sensor electrodes 421, . . . , and 42n.

The ADC circuit 152 converts the analog detection signals Rx acquired by the reading circuit 151 into digital signals.

The DSP circuit 153 performs digital filtering on digital data resulting from conversion by the ADC circuit 152 to generate the detection signals Rx.

The AFE circuit 15 outputs the sensing data generated by the DSP circuit 153 to the control circuit 60 via the second isolator 50.

The control circuit 60 includes a reading circuit 61, a noise determination circuit 62, a coordinate calculation circuit 63, and a storage circuit 64. Each of the circuit elements of the control circuit 60 operates with the first reference potential GND1, which is a fixed potential, as the ground potential.

The reading circuit 61 acquires the sensing data output from the AFE circuit 15 via the second isolator 50.

The noise determination circuit 62 performs the noise determination described above based on the sensing data acquired by the reading circuit 61.

The coordinate calculation circuit 63 performs the coordinate calculation described above based on the sensing data acquired by the reading circuit 61.

The storage circuit 64 holds in advance the DP control reference data indicating the correspondence between the fundamental frequency of the square wave signal Tx output from the AFE circuit 15 and the electrical resistance of the digital potentiometer 22. The DP control reference data is, for example, tabular data in which the values of the fundamental frequency of the square wave signal Tx output from the AFE circuit 15 corresponds one-to-one to the values of the electrical resistance of the digital potentiometer 22.

The control circuit 60 refers to the DP control reference data held in the storage circuit 64 and outputs an electrical resistance setting command to set the value of the electrical resistance of the digital potentiometer 22 to the value of an electrical resistance corresponding to the value of the fundamental frequency of the square wave signal Tx output from the AFE circuit 15.

The control circuit 60 has a function of changing the fundamental frequency of the square wave signal Tx output from the AFE circuit 15. When the fundamental frequency of the square wave signal Tx output from the AFE circuit 15 is changed, the control circuit 60 re-sets the electrical resistance of the digital potentiometer 22 in accordance with the changed fundamental frequency of the square wave signal Tx.

Figure 13:
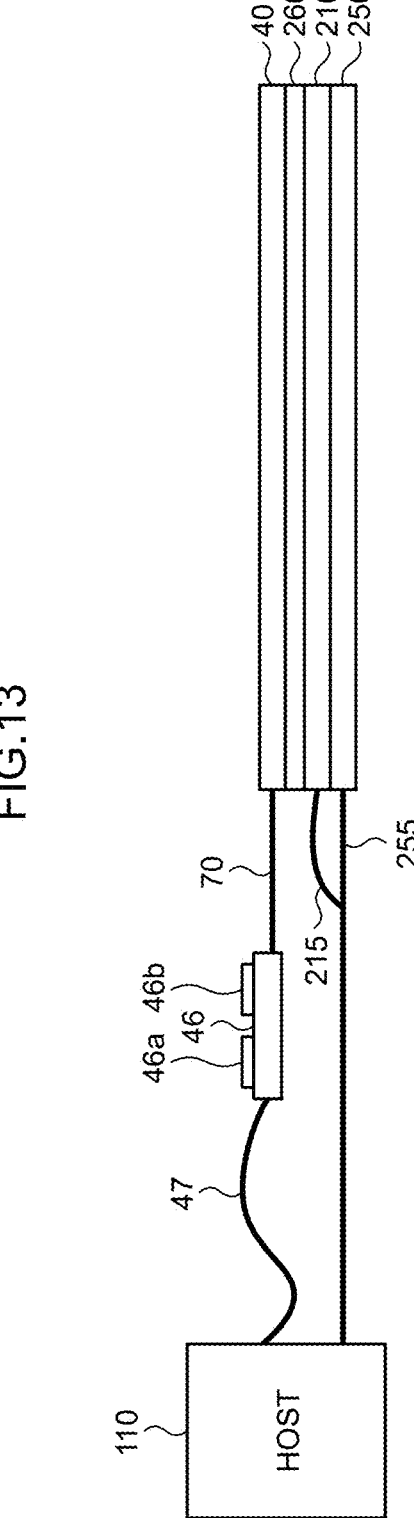
FIG. 13 is a schematic of a coupling example in a configuration where a touch panel is stacked besides the display panel.

FIG. 13 is a schematic of a coupling example in a configuration where a touch panel 210 is stacked besides the display panel 250. The sensor circuit 40 of the detection device 1 is provided overlapping the touch panel 210. The touch panel 210 is a touch detection device that detects an object to be detected that is in contact with the detection surface (hereinafter also referred to as "touch detection"). The touch panel 210 according to the present disclosure performs self-capacitance or mutual capacitance touch detection.

In the device configuration illustrated in FIG. 13, the touch panel 210 is sandwiched between the display panel 250 and the sensor circuit 40.

The touch panel 210 includes an FPC 215. The FPC 215 is provided with various circuits related to the operations of the touch panel 210. The FPC 215 is coupled to the FPC 255. The FPC 255 is coupled to the processing device 110. The processing device 110 is a device that functions as a host computer for the device including the sensor circuit 40, the touch panel 210, and the display panel 250, for example.

In the configuration illustrated in FIG. 13, the sensor circuit 40 of the detection device 1 performs hover detection using an electric field due to capacitance. Similarly, the touch panel 210 performs touch detection using an electric field due to capacitance.

In this configuration, there is a possibility of mutual interference between hover detection performed by the sensor circuit 40 of the detection device 1 and touch detection performed by the touch panel 210. Specifically, if the drive frequency in self-capacitance hover detection is the same as the drive frequency in self-capacitance or mutual capacitance touch detection, for example, the harmonic components (high-frequency noise components) of the square wave signal Tx may be superimposed on the electrodes of the touch panel 210, and thereby touch detection performed by the touch panel 210 may possibly malfunction. The drive frequency in self-capacitance hover detection described above refers to the fundamental frequency of the square wave signal Tx output from the AFE circuit 15.

The control circuit 60 according to the present disclosure can change the drive frequency in self-capacitance hover detection, that is, the fundamental frequency of the square wave signal Tx output from the AFE circuit 15. This configuration can prevent malfunction of touch detection performed by the touch panel 210. The changing of the fundamental frequency of the square wave signal Tx is hereinafter also referred to as "frequency hopping".

Figure 14:
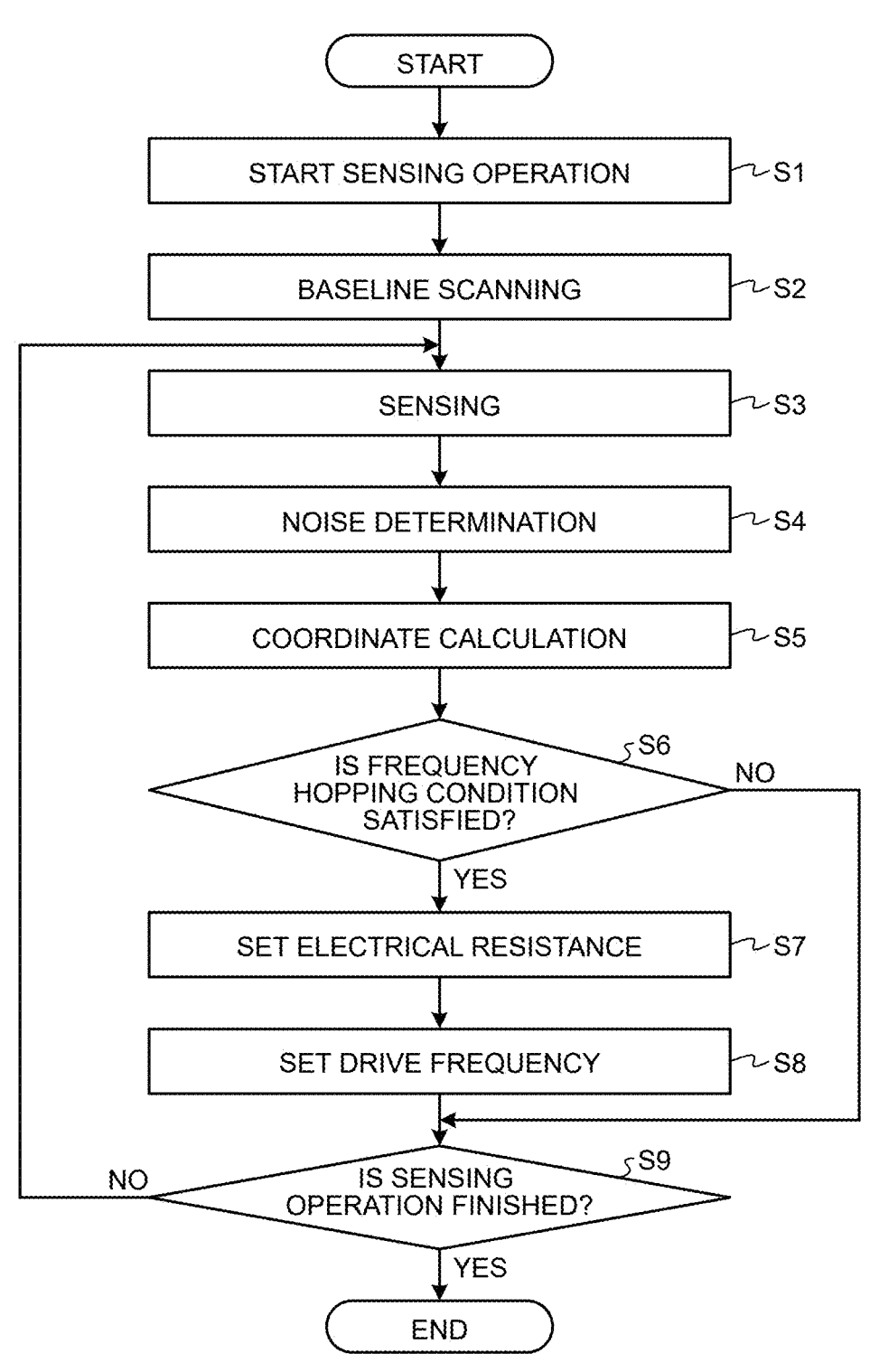
FIG. 14 is a flowchart of an example of a hover detection operation in the detection device.

FIG. 14 is a flowchart of an example of a hover detection operation in the detection device 1. When electric power is supplied from the power supply circuit 11, and a sensing operation by the detection device 1 starts (Step S1), the detection device 1 performs baseline scanning of acquiring the detection signal Rx in a state where no object to be detected is in proximity to the sensor circuit 40 (Step S2).

After performing the baseline scanning, the detection device 1 performs a normal hover detection operation (sensing) (Step S3). The control circuit 60 performs the noise determination and the coordinate calculation described above based on the difference between the detection signal Rx acquired by the baseline scanning (Step S2) and the detection signal Rx acquired by the sensing (Step S3).

More specifically, the noise determination circuit 62 performs the noise determination (Step S4) based on the difference between the detection signal Rx acquired by the baseline scanning (Step S2) and the detection signal Rx acquired by the sensing (Step S3).

The coordinate calculation circuit 63 performs the coordinate calculation (Step S5) based on the difference between the detection signal Rx acquired by the baseline scanning (Step S2) and the detection signal Rx acquired by the sensing (Step S3).

While the coordinate calculation (Step S5) is performed after the noise determination (Step S4) in FIG. 14, the noise determination (Step S4) may be performed after the coordinate calculation (Step S5), or the noise determination (Step S4) and the coordinate calculation (Step S5) may be performed in parallel.

Subsequently, the control circuit 60 determines whether the condition for performing the frequency hopping described above (hereinafter also referred to simply as "frequency hopping condition") is satisfied (Step S6). Specifically, the control circuit 60 determines whether the control circuit 60 has received a signal containing a frequency hopping command that instructs the detection device 1 to perform frequency hopping, from the processing device 110 coupled via the FPC 255 illustrated in FIG. 13.

The frequency hopping condition is not limited to that described above. For example, the processing device 110 may acquire the drive frequency of the detection device 1 and the drive frequency of the touch panel 210, and it may be determined that the frequency hopping condition is satisfied when both are the same. Alternatively, the control circuit 60 of the detection device 1 may acquire the drive frequency of the touch panel 210, and it may be determined that the frequency hopping condition is satisfied when the drive frequency of the touch panel 210 is the same as the frequency of the square wave signal Tx. Still alternatively, the control circuit 60 may determine whether the frequency hopping condition is satisfied.

If the frequency hopping condition is not satisfied (No at Step S6), the detection device 1 performs the processing at Step S9.

If the frequency hopping condition is satisfied (Yes at Step S6), the control circuit 60 sets the electrical resistance of the digital potentiometer 22 to a value corresponding to the frequency of the square wave signal Tx after frequency hopping (Step S7). Specifically, the control circuit 60 refers to the DP control reference data described above, for example, and sets the electrical resistance of the digital potentiometer 22 to the electrical resistance corresponding to the frequency of the square wave signal Tx after frequency hopping. As a result, the electrical resistance of the digital potentiometer 22 is controlled to be the electrical resistance corresponding to the square wave signal Tx after frequency hopping.

The control circuit 60 sets the drive frequency in hover detection, that is, the fundamental frequency of the square wave signal Tx output from the AFE circuit 15 to the frequency after frequency hopping (Step S8).

In FIG. 14, the drive frequency in hover detection (fundamental frequency of the square wave signal Tx) is set (Step S8) after the electrical resistance of the digital potentiometer 22 is set (Step S7), for example. Alternatively, the electrical resistance of the digital potentiometer 22 may be set (Step S7) after the drive frequency in hover detection (fundamental frequency of the square wave signal Tx) is set (Step S8). Still alternatively, the setting of the electrical resistance of the digital potentiometer 22 (Step S7) and the setting of the drive frequency in the hover detection (fundamental frequency of the square wave signal Tx) (Step S8) may be performed in parallel.

If the sensing operation by the detection device 1 is finished (Yes at Step S9), the detection device 1 ends the hover detection operation. Examples of the case where the sensing operation is finished include, but are not limited to, when the power supply circuit 11 does not supply the electric power, when the processing device 110 outputs a command to finish the sensing operation to the detection device 1, etc. If the sensing operation by the detection device 1 is not finished (No at Step S9), the detection device 1 performs the processing from Step S3 again.

Figure 15:
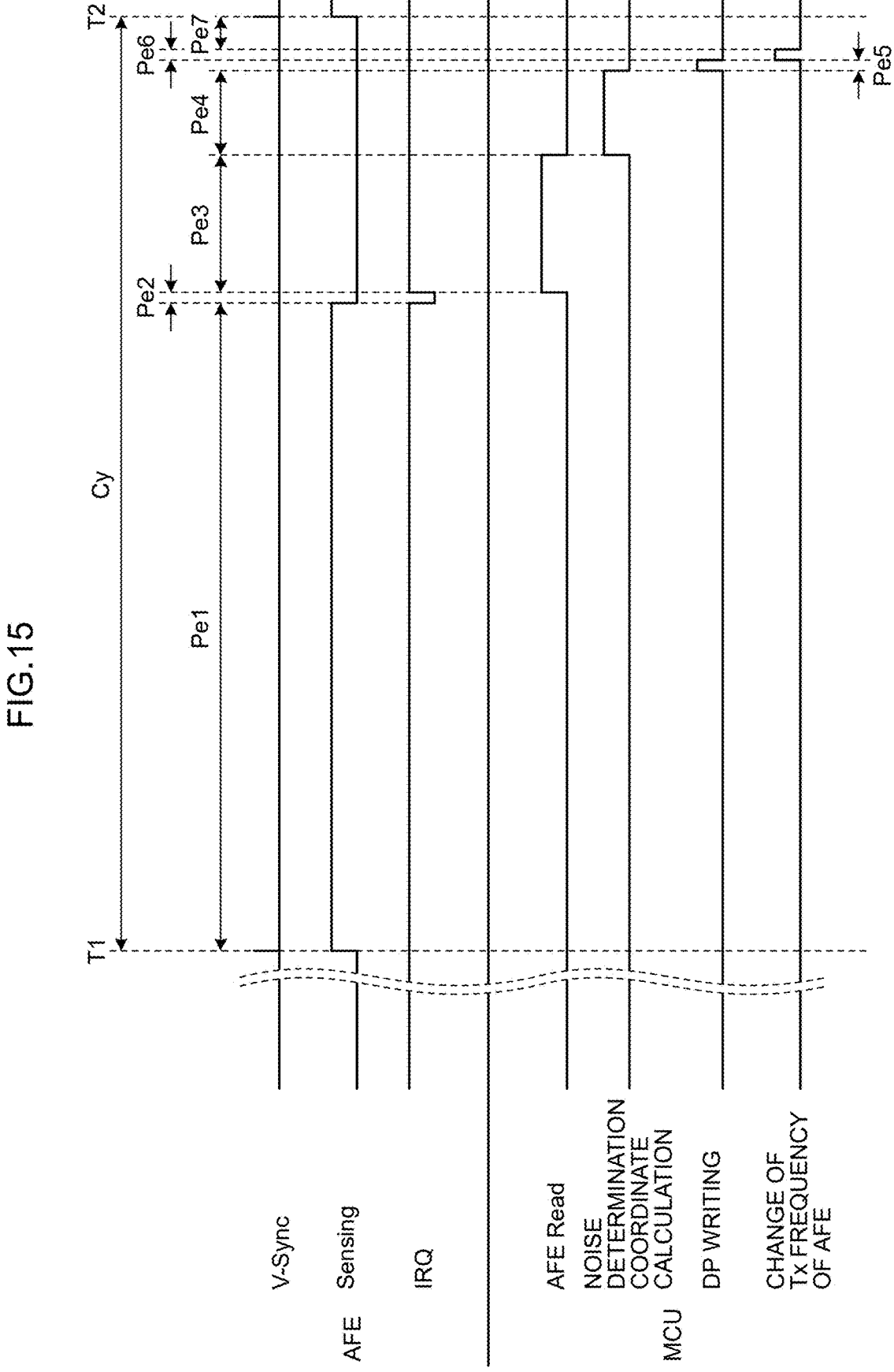
FIG. 15 is a timing chart of an example of the procedure of operations performed by the detection device that can perform frequency hopping.

FIG. 15 is a timing chart of an example of the procedure of operations performed by the detection device 1 that can perform frequency hopping. The procedure of the hover detection operation performed by the detection device 1 is set on a repetition period Cy basis. First, a clock signal (V-Sync) indicating the start of the repetition period Cy is output at preset intervals. In FIG. 15, the clock signal is output at timings T1 and T2. The following describes the procedure of operations in the repetition period Cy starting from timing T1.

The sensing operation (Sensing) corresponding to Step S3 described above is performed from timing T1. The sensing operation is performed in a period Pe1 from timing T1 to the start point of a period Pe2 during which an interrupt signal (IRQ) indicating the end of the sensing operation is generated.

Periods Pe3, Pe4, Pe5, Pe6, and Pe7 sequentially occur from the end point of the period Pe2 to timing T2.

The period Pe3 is a period when the sensing data output from the AFE circuit 15 via the second isolator 50 is read (AFE Read).

The period Pe4 is a period when the noise determination corresponding to Step S4 described above and the coordinate calculation corresponding to Step S5 described above are performed in parallel.

The period Pe5 is a period during which a command is output (information is written) to reflect the electrical resistance, corresponding to the fundamental frequency of the square wave signal Tx after frequency hopping, into the digital potentiometer 22, if perform frequency hopping is performed.

The period Pe6 is a period during which a command is output (information is written) to the AFE circuit 15 to set the fundamental frequency of the square wave signal Tx to the frequency after frequency hopping, if frequency hopping is performed.

The period Pe7 is a blank period from the end of the period Pe6 to timing T2.

The periods Pe1, . . . , and Pe7 described above are repeated again from timing T2. After this, the periods Pe1, . . . , and Pe7 described above are repeated again every time the clock signal (V-Sync) indicating the start of the repetition period Cy is output at preset intervals.

The fundamental frequency of the square wave signal Tx before and after the changing of frequency hopping falls within a frequency setting range (e.g., 140 kHz to 200 kHz) of the square wave signal Tx in the AFE circuit 15. The frequency setting range (140 kHz to 200 kHz) of the square wave signal Tx in the AFE circuit 15 is given by way of example only as described above, and the present embodiment is not limited thereto.

As described above, the signals between the AFE circuit 15 and the control circuit 60 according to the present disclosure are transmitted by a serial peripheral interface (SPI), which is a clock synchronous serial interface, for example. The signals between the control circuit 60 and the processing device 110 according to the present disclosure are transmitted by USB, for example.

In the configuration according to the embodiment, the second isolator 50 is provided on the signal transmission path between the AFE circuit 15 and the control circuit 60 as illustrated in FIG. 5. This configuration may possibly limit the communication speed between the AFE circuit 15 and the control circuit 60.

Specifically, the practical communication speed of a general-purpose photocoupler commonly used as the second isolator 50 is approximately several kilobits per second. Even if a magnetically isolated digital isolator that enables faster communications is used, a propagation delay of approximately several nanoseconds may be occur, or an input of delayed clock may be required.

Figure 16:
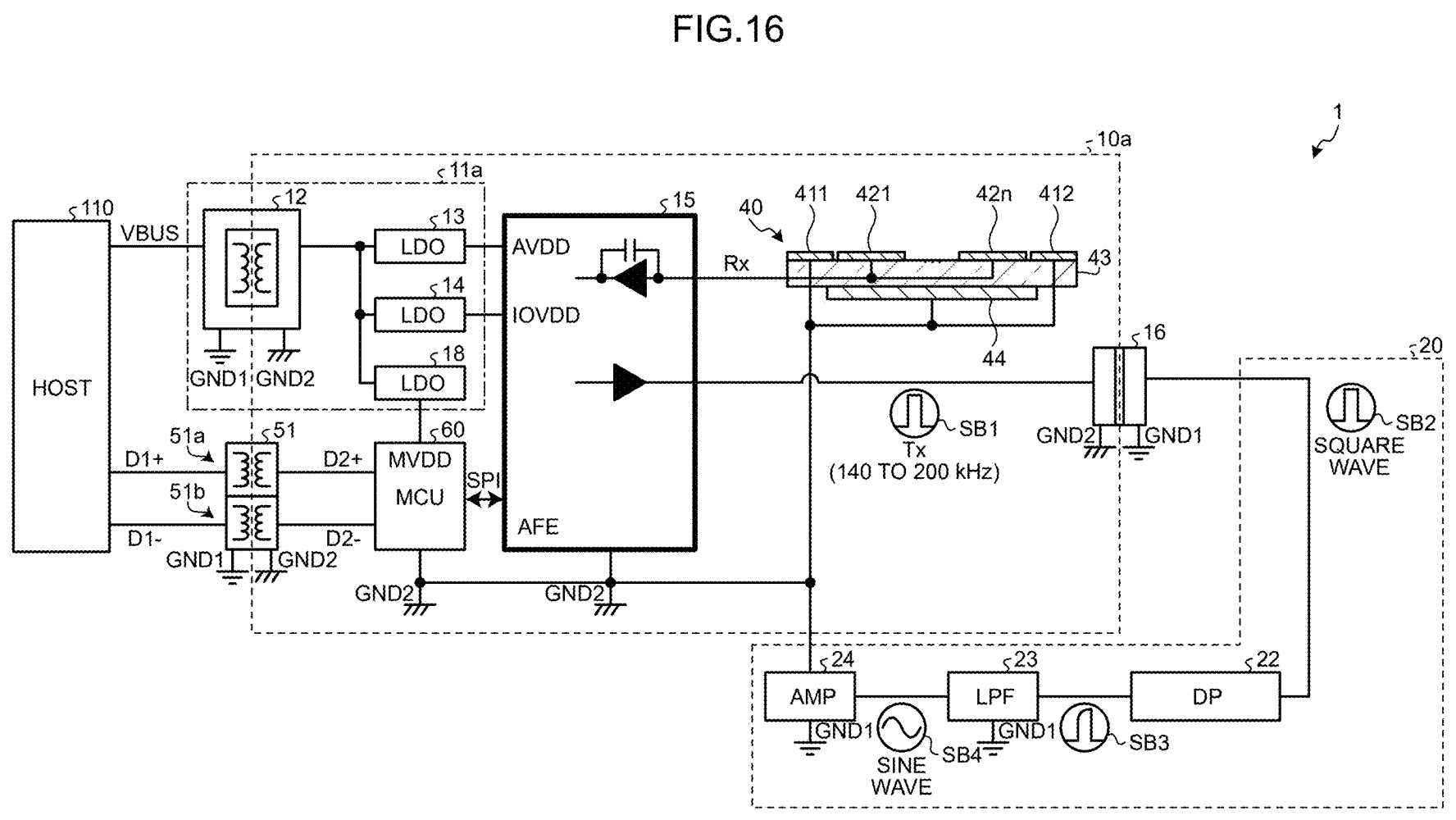
Figure 17:
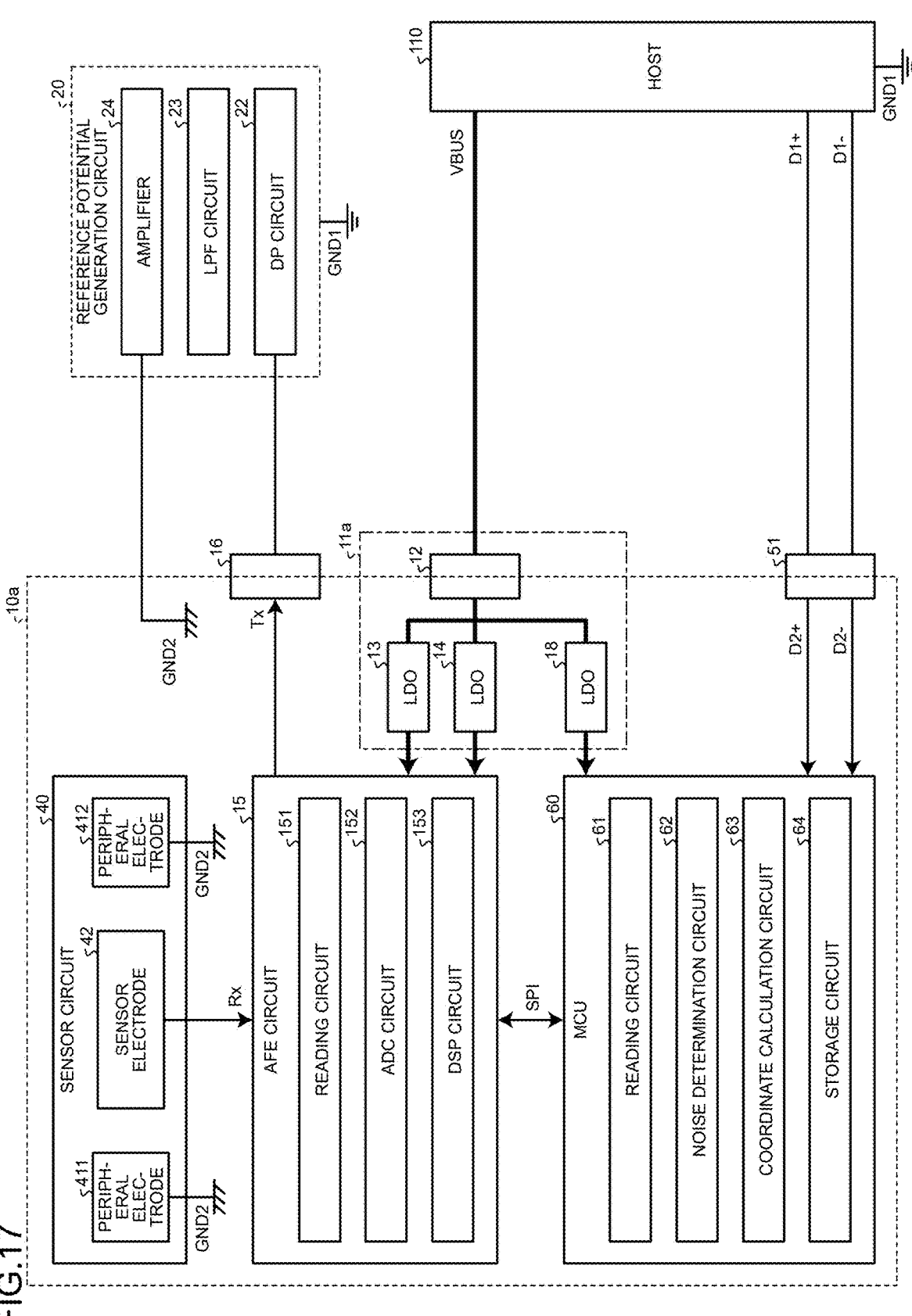
FIG. 17 is a diagram of an exemplary functional circuit block configuration of the detection device according to the first embodiment.

The following describes the configuration according to the first embodiment with reference to FIGS. 16 and 17. FIG. 16 is a diagram of an exemplary block configuration of the detection device 1 according to the first embodiment. FIG. 17 is a diagram of an exemplary functional circuit block configuration of the detection device 1 according to the first embodiment. The same components as those according to the embodiment illustrated in FIGS. 5 and 12 are denoted by the same reference numerals, and detailed explanation thereof may be omitted.

In the configuration according to the first embodiment illustrated in FIGS. 16 and 17, the control circuit 60 is included in the detection block 10a. In other words, in the configuration illustrated in FIGS. 16 and 17, the control circuit 60 operates with the second reference potential GND2 generated by the reference potential generation circuit 20 as the ground potential. More specifically, the reading circuit 61, the noise determination circuit 62, the coordinate calculation circuit 63, and the storage circuit 64 of the control circuit 60 illustrated in FIG. 17 operate with the second reference potential GND2, which is a periodically varying potential generated by the reference potential generation circuit 20, as the ground potential.

In the configuration according to the first embodiment illustrated in FIGS. 16 and 17, a power supply circuit 11a includes a linear regulator (LDO) 18. The linear regulator 18 is included in the detection block 10a.

The linear regulator 18 is interposed between the isolated DC-DC converter 12 and the control circuit 60 to adjust the output voltage supplied to the control circuit 60 to a more appropriate voltage. The linear regulator 18 outputs a voltage required as the power supply for the control circuit 60 with the second reference potential GND2 as the ground potential.

The AFE circuit 15 transmits and receives signals, such as the sensing data and various control commands, to and from the control circuit 60. Specifically, the AFE circuit 15 outputs the sensing data indicating the detection results of hover detection to the control circuit 60, for example.

As described above, in the configuration according to the first embodiment, the control circuit 60 operates with the second reference potential GND2 as the ground potential in the same manner as the AFE circuit 15. The control circuit 60 transmits and receives signals, such as various kinds of information on the sensing data and control commands, to and from the processing device 110 via a second isolator 51.

The second isolator 51 isolates the processing device 110 from the detection block 10a and transmits signals between the control circuit 60 and the processing device 110.

Specifically, the electrical signal with the first reference potential GND1 (fixed potential) as the ground potential, which is output from the terminal on the processing device 110 side of the second isolator 51, is synchronized with the electrical signal with the second reference potential GND2 as the ground potential, which is output from the detection block 10a.

The electrical signal with the second reference potential GND2 as the ground potential, which is output from the terminal on the detection block 10a side of the second isolator 51, is synchronized with the electrical signal with the first reference potential GND1 (fixed potential) as the ground potential, which is output from the processing device 110.

Signal transmission between the control circuit 60 and the processing device 110 in the second isolator 51 is performed by a magnetic isolation method based on the same principle as the isolated DC-DC converter 12. The second isolator 51 performs mutual signal transmission by a magnetic isolation method between the coil on the processing device 110 side and the coil on the control circuit 60 side. In other words, the second isolator 51 is a magnetically isolated digital isolator, for example.

The second isolator 51 can perform bidirectional transmission, that is, transmission output from the control circuit 60 to the processing device 110 and transmission output from the processing device 110 to the control circuit 60. More specifically, in an aspect where signals are transmitted between the control circuit 60 and the processing device 110 by USB, the second isolator 51 is a USB isolator that electrically isolates the USB host-side circuit (processing device 110) from the USB device-side circuit (control circuit 60).

The second isolator (USB isolator) 51 includes a plurality of magnetic coupling circuits (magnetic coupling circuits 51a and 51b). In the configuration illustrated in FIG. 16, the magnetic coupling circuit 51a is provided between a signal line D1+ on the processing device 110 side and a signal line D2+ on the control circuit 60 side. The magnetic coupling circuit 51a performs mutual signal transmission by a magnetic isolation method, between the coil on the processing device 110 side and the coil on the control circuit 60 side. In the configuration illustrated in FIG. 16, the magnetic coupling circuit 51b is provided between a signal line D1− on the processing device 110 side and a signal line D2− on the control circuit 60 side. The magnetic coupling circuit 51b performs mutual signal transmission by a magnetic isolation method, between the coil on the processing device 110 side and the coil on the control circuit 60 side.

In the aspect where signals are transmitted between the control circuit 60 and the processing device 110 by USB, the USB may include a plurality of transmission lines and reception lines besides the signal lines. In this case, the second isolator 51 simply needs to include a plurality of magnetic coupling circuits corresponding to the respective signal lines, transmission lines, and reception lines.

In the configuration of the detection device 1 according to the first embodiment described above, the control circuit 60 is included in the detection block 10a together with the sensor circuit 40 and the AFE circuit 15. Therefore, the transmission paths for the signals, such as the sensing data and various control commands, transmitted between the AFE circuit 15 and the control circuit 60 are electrically coupled with no photocoupler or digital isolator interposed therebetween. This configuration can suppress limitation in the communication speed between the AFE circuit 15 and the control circuit 60.

More specifically, in the timing chart illustrated in FIG. 15, for example, the period Pe3 during which the sensing data output from the AFE circuit 15 is read (AFE Read) can be shortened. As a result, the period Pe1 during which the sensing operation (Sensing) is performed can be made longer, thereby improving the SNR, for example. Alternatively, the repetition period Cy for the hover detection operation performed by the detection device 1 can be shortened, thereby improving the frame rate, for example.

Second Embodiment

Figure 18:
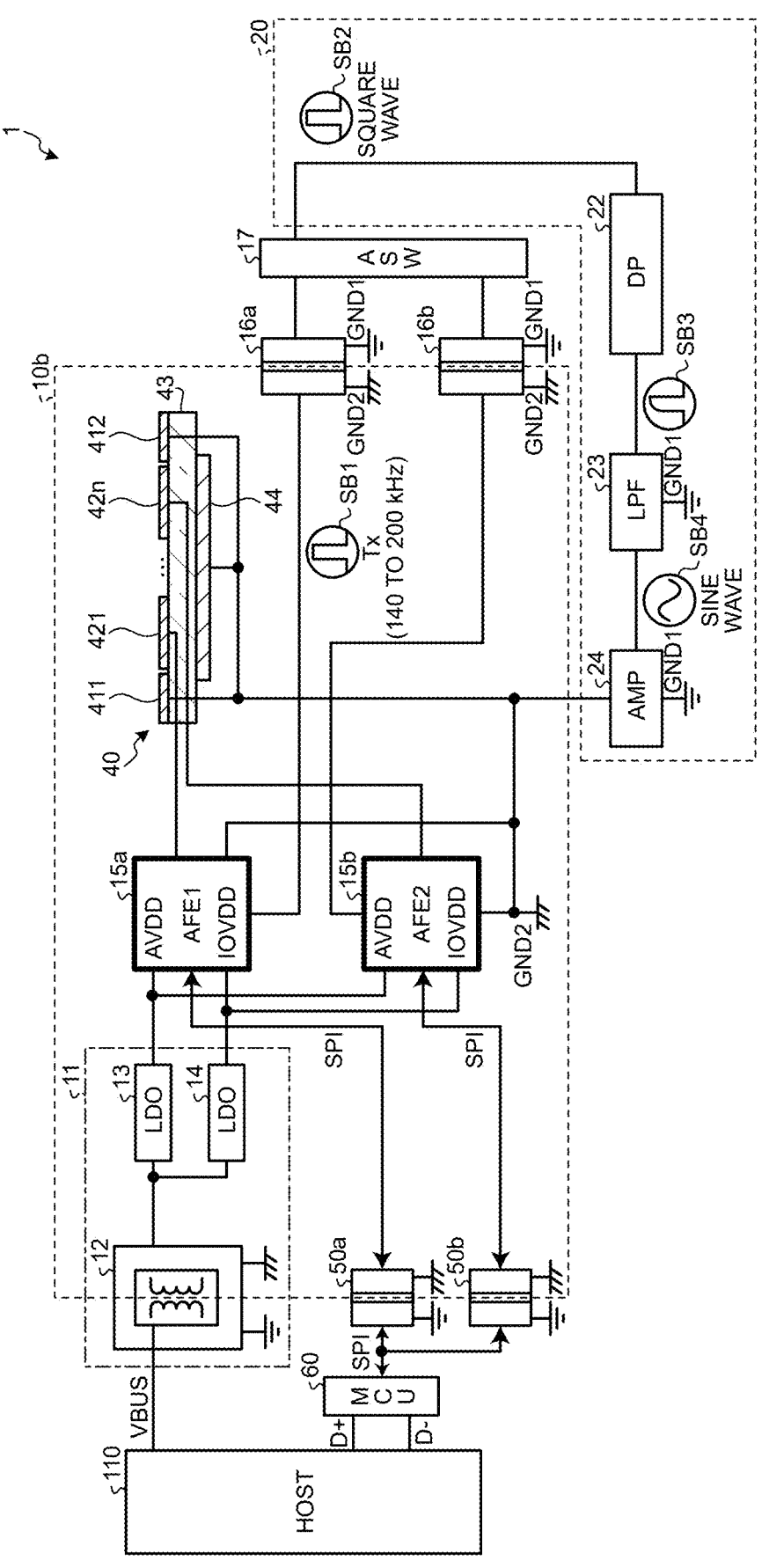
FIG. 18 is a diagram of an exemplary block configuration of the detection device according to a modification of the embodiment.
Figure 19:
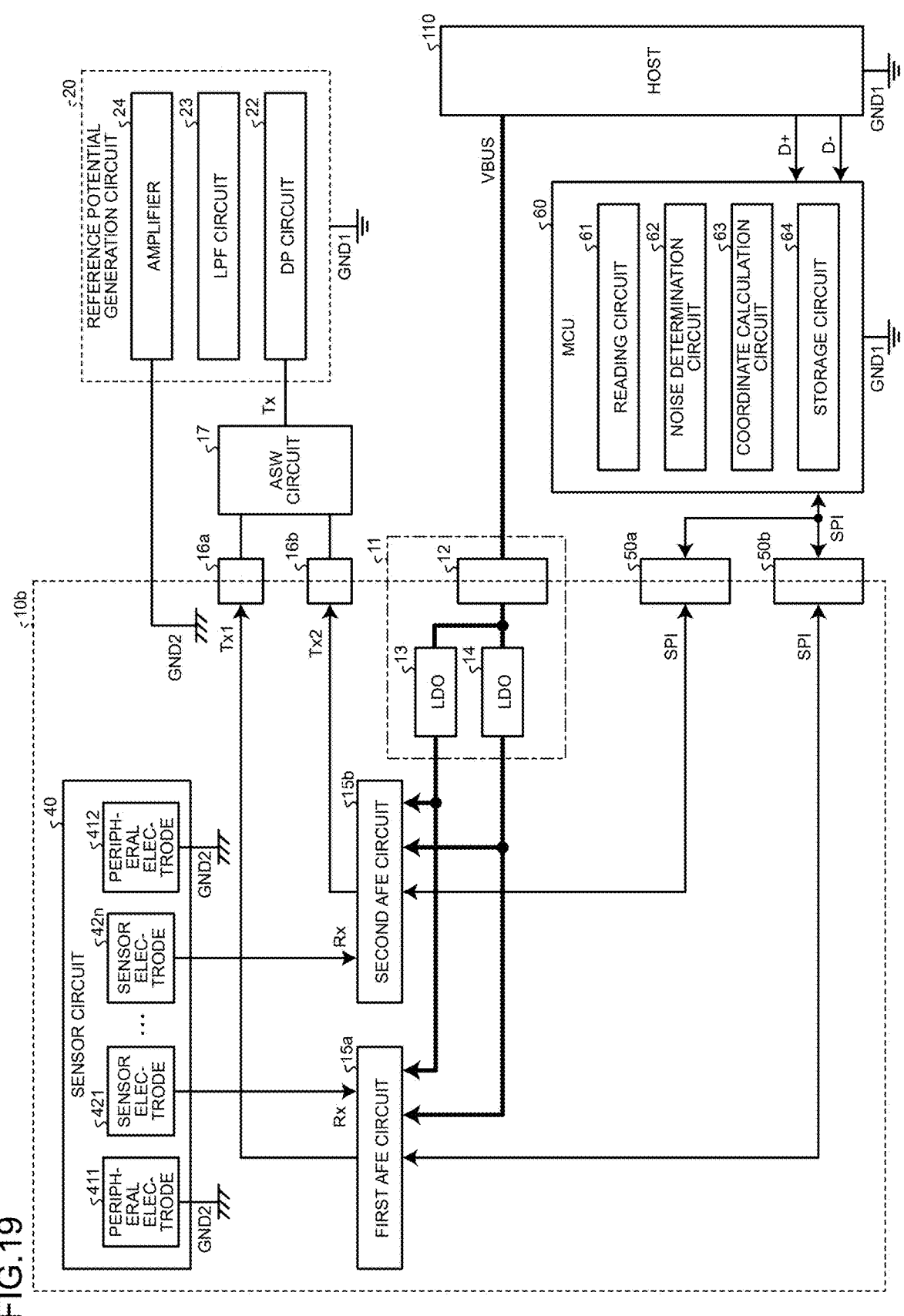
FIG. 19 is a diagram of an exemplary functional circuit block configuration of the detection device according to the modification of the embodiment.

FIG. 18 is a diagram of an exemplary block configuration of the detection device according to a modification of the embodiment. FIG. 19 is a diagram of an exemplary functional circuit block configuration of the detection device according to the modification of the embodiment. The same components as those according to the embodiment and the first embodiment are denoted by the same reference numerals, and detailed explanation thereof may be omitted.

The configuration according to the modification of the embodiment illustrated in FIGS. 18 and 19 includes a plurality of AFE circuits (a first AFE circuit 15a and a second AFE circuit 15b) compared with the configuration according to the embodiment illustrated in FIGS. 5 and 12. In the configuration according to the modification of the embodiment illustrated in FIGS. 18 and 19, the first AFE circuit 15a is coupled to a half of the sensor electrodes 421, . . . , and 42n, and the second AFE circuit 15b is coupled to the other half of the sensor electrodes 421, and 42n not coupled to the first AFE circuit 15a.

In the configuration according to the modification of the embodiment, first isolators 16a and 16b and second isolators 50a and 50b are provided corresponding to the first AFE circuit 15a and the second AFE circuit 15b, respectively.

The configuration according to the modification of the embodiment includes an analog switch circuit (ASW) 17 that appropriately selects the square wave signal Tx output from the first AFE circuit 15a and the second AFE circuit 15b.

In the configuration according to the modification of the embodiment, the square wave signal Tx output from the first AFE circuit 15a is transmitted via the first isolator 16a and output to the reference potential generation circuit 20.

The first isolator 16a isolates the reference potential generation circuit 20 from a detection block 10b and transmits the square wave signal Tx output from the first AFE circuit 15a.

Specifically, the square wave signal with the first reference potential GND1 (fixed potential) as the ground potential, which is output from the terminal on the reference potential generation circuit 20 side of the first isolator 16a, is synchronized with the square wave signal Tx with the second reference potential GND2 as the ground potential, which is output from the first AFE circuit 15a.

In the configuration according to the modification of the embodiment, the square wave signal Tx output from the second AFE circuit 15b is transmitted via the first isolator 16b and output to the reference potential generation circuit 20.

The first isolator 16b isolates the reference potential generation circuit 20 from the detection block 10b and transmits the square wave signal Tx output from the second AFE circuit 15b.

Specifically, the square wave signal with the first reference potential GND1 (fixed potential) as the ground potential, which is output from the terminal on the reference potential generation circuit 20 side of the first isolator 16b, is synchronized with the square wave signal Tx with the second reference potential GND2 as the ground potential, which is output from the second AFE circuit 15b.

In the configuration according to the modification of the embodiment, the analog switch circuit 17 operates with the first reference potential GND1, which is a fixed potential, as the ground potential. In an aspect where the first AFE circuit 15a and the second AFE circuit 15b operate synchronously, the analog switch circuit 17 is not necessarily provided.

The first AFE circuit 15a transmits and receives signals, such as the sensing data and various control commands, to and from the control circuit 60 via the second isolator 50a.

The second isolator 50a isolates the control circuit 60 from the detection block 10b and transmits signals between the first AFE circuit 15a and the control circuit 60.

Specifically, the electrical signal with the first reference potential GND1 (fixed potential) as the ground potential, which is output from the terminal on the control circuit 60 side of the second isolator 50a, is synchronized with the electrical signal with the second reference potential GND2 as the ground potential, which is output from the detection block 10b.

The electrical signal with the second reference potential GND2 as the ground potential, which is output from the terminal on the detection block 10b side of the second isolator 50a, is synchronized with the electrical signal with the first reference potential GND1 (fixed potential) as the ground potential, which is output from the control circuit 60.

Examples of the second isolator 50a include, but are not limited to, an optically isolated photocoupler, a magnetically isolated digital isolator, etc. The second isolator 50a can perform bidirectional transmission, that is, transmission output from the control circuit 60 side to the detection block 10b side and transmission output from the detection block 10b side to the control circuit 60 side.

The second AFE circuit 15b transmits and receives signals, such as the sensing data and various control commands, to and from the control circuit 60 via the second isolator 50b.

The second isolator 50b isolates the control circuit 60 from the detection block 10b and transmits signals between the second AFE circuit 15b and the control circuit 60.

Specifically, the electrical signal with the first reference potential GND1 (fixed potential) as the ground potential, which is output from the terminal on the control circuit 60 side of the second isolator 50b, is synchronized with the electrical signal with the second reference potential GND2 as the ground potential, which is output from the detection block 10b.

The electrical signal with the second reference potential GND2 as the ground potential, which is output from the terminal on the detection block 10b side of the second isolator 50b, is synchronized with the electrical signal with the first reference potential GND1 (fixed potential) as the ground potential, which is output from the control circuit 60.

Examples of the second isolator 50b include, but are not limited to, an optically isolated photocoupler, a magnetically isolated digital isolator, etc. The second isolator 50b can perform bidirectional transmission, that is, transmission output from the control circuit 60 side to the detection block 10b side and transmission output from the detection block 10b side to the control circuit 60 side.

The control circuit 60 transmits and receives signals, such as various kinds of information on sensing data and control commands, to and from the processing device 110.

As described above, in the configuration according to the modification of the embodiment, the number of first isolators 16 (first isolators 16a and 16b) and the number of second isolators 50 (second isolators 50a and 50b) increase as the number of signals transmitted inside and outside the detection block 10b increases as illustrated in FIGS. 18 and 19.

Figure 20:
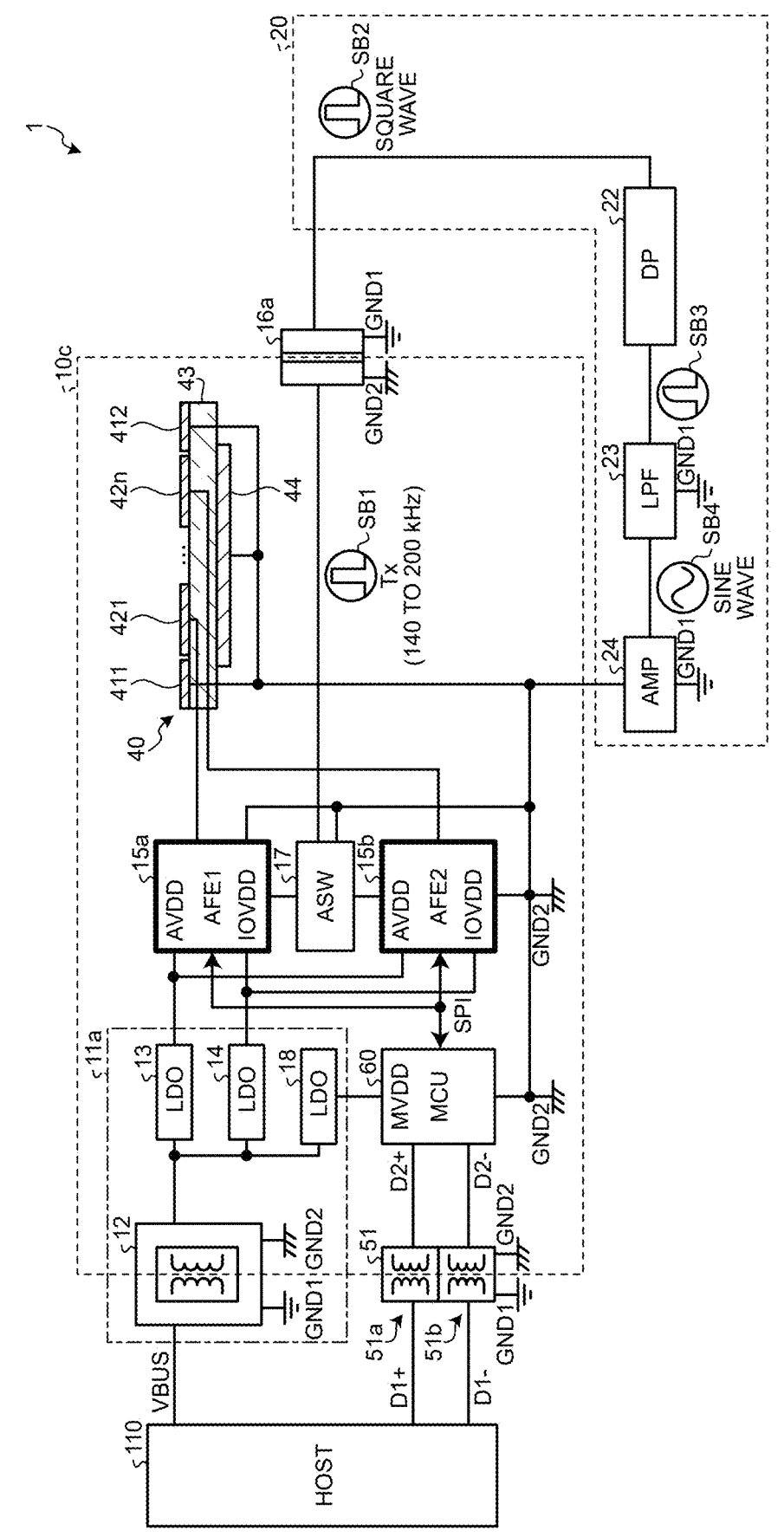
FIG. 20 is a diagram of an exemplary block configuration of the detection device according to a second embodiment.
Figure 21:
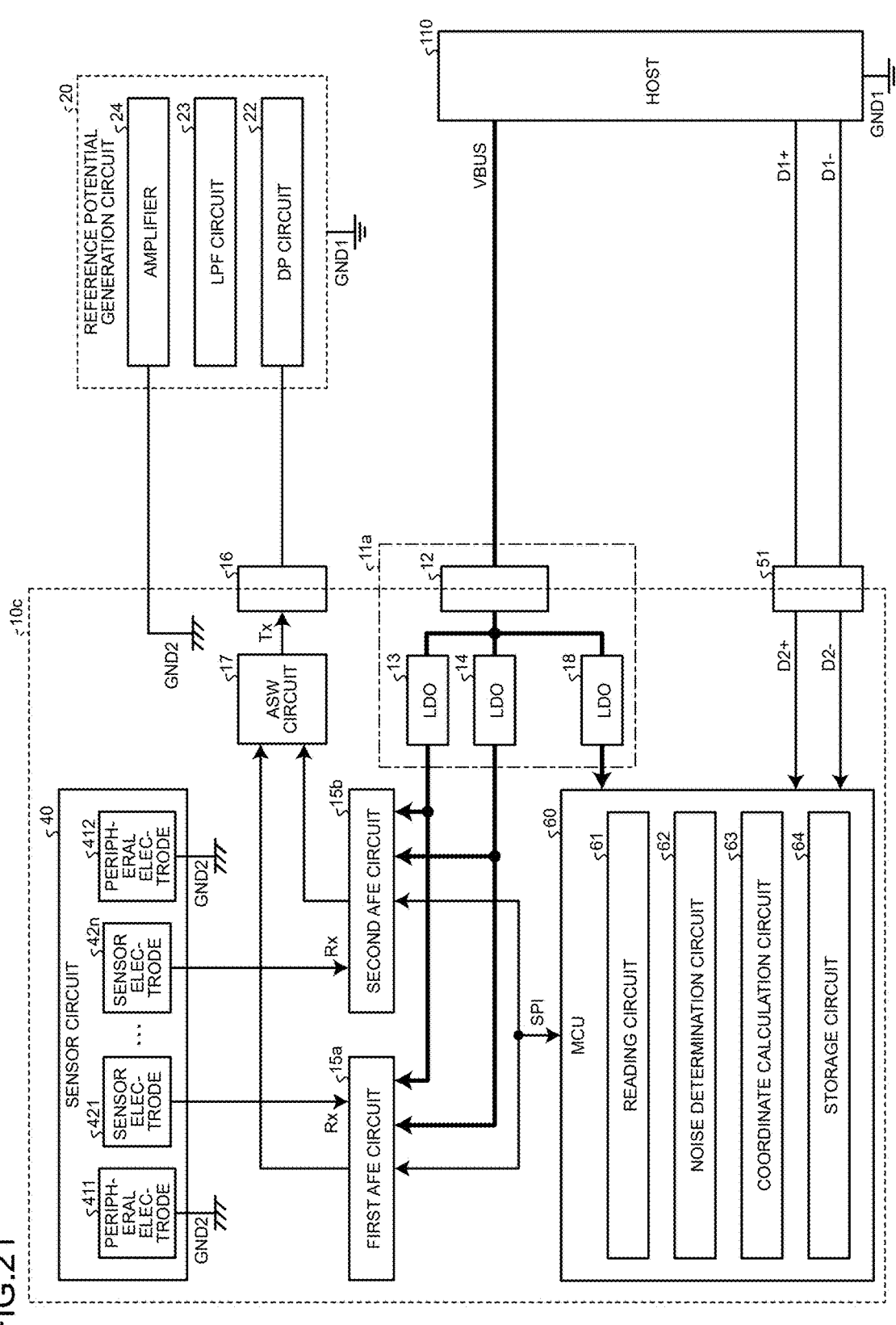
FIG. 21 is a diagram of an exemplary functional circuit block configuration of the detection device according to the second embodiment.

The following describes the configuration according to a second embodiment with reference to FIGS. 20 and 21. FIG. 20 is a diagram of an exemplary block configuration of the detection device according to the second embodiment. FIG. 21 is a diagram of an exemplary functional circuit block configuration of the detection device according to the second embodiment. The same components as those according to the embodiment, the first embodiment, and the modification of the embodiment are denoted by the same reference numerals, and detailed explanation thereof may be omitted.

In the configuration according to the second embodiment illustrated in FIGS. 20 and 21, the analog switch circuit 17 is included in a detection block 10c together with the control circuit 60. In other words, in the configuration illustrated in FIGS. 20 and 21, the analog switch circuit 17 and the control circuit 60 operate with the second reference potential GND2, which is generated by the reference potential generation circuit 20, as the ground potential.

More specifically, the analog switch circuit 17, and the reading circuit 61, the noise determination circuit 62, the coordinate calculation circuit 63, and the storage circuit 64 of the control circuit 60 illustrated in FIG. 21 operate with the second reference potential GND2, which is a periodically varying potential generated by the reference potential generation circuit 20, as the ground potential.

In the configuration according to the second embodiment, the first AFE circuit 15a and the second AFE circuit 15b transmit and receive signals, such as the sensing data and various control commands, to and from the control circuit 60. Specifically, the first AFE circuit 15a and the second AFE circuit 15b output the sensing data indicating the detection results of hover detection to the control circuit 60, for example.

In the configuration according to the second embodiment, the control circuit 60 transmits and receives signals, such as various kinds of information on the sensing data and control commands, to and from the processing device 110 via the second isolator 51.

Similarly to the configuration according to the first embodiment, the second isolator 51 is a magnetically isolated digital isolator, for example. More specifically, in an aspect where signals are transmitted between the control circuit 60 and the processing device 110 by USB, the second isolator 51 is a USB isolator that electrically isolates the USB host-side circuit (processing device 110) from the USB device-side circuit (control circuit 60).

In the configuration of the detection device 1 according to the second embodiment described above, the control circuit 60 is included in the detection block 10c together with the sensor circuit 40, the first AFE circuit 15a, and the second AFE circuit 15b. Therefore, the transmission paths for the signals, such as the sensing data and various control commands, transmitted between the control circuit 60 and each of the first AFE circuit 15a and the second AFE circuit 15b are electrically coupled with no photocoupler or digital isolator interposed therebetween. This configuration can suppress limitation in the communication speed between the control circuit 60 and each of the first AFE circuit 15a and the second AFE circuit 15b similarly to the configuration according to the first embodiment.

More specifically, in the timing chart illustrated in FIG. 15, for example, the period Pe3 during which the sensing data output from the first AFE circuit 15a and the second AFE circuit 15b is read (AFE Read) can be shortened. As a result, the period Pe1 during which the sensing operation (Sensing) is performed can be made longer, thereby improving the SNR, for example, similarly to the configuration according to the first embodiment. Alternatively, the repetition period Cy for the hover detection operation performed by the detection device 1 can be shortened, thereby improving the frame rate, for example.

In the configuration according to the modification of the embodiment described above, the number of isolators (the first isolators 16a and 16b and the second isolators 50a and 50b) increases as the number of signals transmitted inside and outside the detection block 10b increases. In contrast thereto, the configuration of the detection device 1 according to the second embodiment suppresses an increase in the number of signals transmitted inside and outside the detection block 10c, thereby suppressing an increase in the number of isolators. This can prevent an increase in cost and size due to an increase in the number of isolators.

The digital potentiometer 22 according to the embodiments described above is included in the reference potential generation circuit 20. If radiation noise can be suppressed only by the low-pass filter 23, a configuration without the digital potentiometer 22 can be employed. This configuration does not require an isolator (not illustrated) provided on the transmission path for transmitting electrical resistance setting commands between the control circuit 60 and the digital potentiometer 22.

While exemplary embodiments according to the present disclosure have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the present disclosure. At least one of various omissions, substitutions, and modifications of the components may be made without departing from the gist of the embodiments and the modifications described above.

What is claimed is:

1. A detection device comprising:
a sensor circuit having a detection region;
an AFE circuit configured to acquire a detection signal from the sensor circuit;
a control circuit configured to control the AFE circuit;
a reference potential generation circuit configured to operate with a first reference potential, which is a fixed potential, as a ground potential and generate a second reference potential synchronized with a square wave signal output from the AFE circuit;
a first isolator provided on a transmission path for the square wave signal between the AFE circuit and the reference potential generation circuit; and
a second isolator provided on a signal transmission path between an external processing device that is configured to operate with the first reference potential as the ground potential and the control circuit, wherein
the AFE circuit and the control circuit operate with the second reference potential as the ground potential, and signal transmission paths between the AFE circuit and the control circuit are electrically coupled to each other.

2. The detection device according to claim 1, wherein the first isolator is a photocoupler.

3. The detection device according to claim 1, wherein second isolator is a magnetically isolated digital isolator.

4. The detection device according to claim 1, further comprising:
a power supply circuit configured to supply electric power to the AFE circuit and the control circuit, wherein
the power supply circuit comprises an isolated DC-DC converter provided on a power supply path from an external device that is configured to operate with the first reference potential as the ground potential.

5. The detection device according to claim 1, comprising a plurality of the AFE circuits.

6. The detection device according to claim 1, wherein the sensor circuit comprises:
a plurality of first electrodes provided in the detection region; and
a second electrode provided around the detection region and supplied with the second reference potential, and
the AFE circuit is configured to supply a drive signal to each of the first electrodes and acquire electrical signal output generated in each of the first electrodes as the detection signal.

7. The detection device according to claim 6, wherein the sensor circuit further comprises a shield electrode provided facing the shield electrode and the first electrodes and second electrode with a substrate interposed therebetween.

8. The detection device according to claim 7, wherein the AFE circuit is configured to amplify the drive signal to generate the square wave signal and output the square wave signal to the reference potential generation circuit via the first isolator.

9. The detection device according to claim 8, wherein the reference potential generation circuit is configured to generate a second reference potential having a substantially square waveform from which a high-frequency component is removed.

10. The detection device according to claim 8, wherein the reference potential generation circuit is configured to generate a second reference potential having a substantially sinusoidal waveform.

* * * * *